United States Patent
Kimberley

(10) Patent No.: US 12,029,150 B2
(45) Date of Patent: Jul. 9, 2024

(54) MOUNTABLE FURROW CLOSING ASSEMBLY

(71) Applicant: Kimberley Ag Consulting, LLC, Maxwell, IA (US)

(72) Inventor: Brock Kimberley, Maxwell, IA (US)

(73) Assignee: KIMBERLEY AG CONSULTING, LLC, Maxwell, IA (US)

( * ) Notice: Subject to any disclaimer, the term of this patent is extended or adjusted under 35 U.S.C. 154(b) by 933 days.

(21) Appl. No.: 16/948,330

(22) Filed: Sep. 14, 2020

(65) Prior Publication Data

US 2021/0059103 A1    Mar. 4, 2021

Related U.S. Application Data

(63) Continuation of application No. PCT/US2019/022297, filed on Mar. 14, 2019.

(60) Provisional application No. 62/642,639, filed on Mar. 14, 2018.

(51) Int. Cl.
*A01C 5/06*    (2006.01)
(52) U.S. Cl.
CPC .................. *A01C 5/068* (2013.01)
(58) Field of Classification Search
CPC ........... A01C 5/068; A01C 5/066; A01C 5/06; A01C 5/00
See application file for complete search history.

(56) References Cited

U.S. PATENT DOCUMENTS

| | | |
|---|---|---|
| 5,517,932 A | 5/1996 | Ott et al. |
| 8,939,095 B2 | 1/2015 | Freed |
| 2012/0189418 A1* | 7/2012 | Husson ............... A01D 87/0076 414/722 |
| 2015/0271986 A1 | 10/2015 | Sauder et al. |
| 2016/0037704 A1 | 2/2016 | Raetzman et al. |
| 2016/0037709 A1 | 2/2016 | Sauder et al. |
| 2017/0049044 A1 | 2/2017 | Stoller et al. |
| 2018/0263174 A1 | 9/2018 | Hodel et al. |

FOREIGN PATENT DOCUMENTS

| | | | |
|---|---|---|---|
| WO | 2017087284 A1 | 5/2017 | |
| WO | 2017197274 A1 | 11/2017 | |
| WO | 2018013669 A1 | 1/2018 | |

OTHER PUBLICATIONS

International Searching Authority in connection with PCT/US2019/022297 filed Mar. 14, 2019, "The International Search Report and the Written Opinion of the International Searching Authority, or the Declaration", 13 pages, dated Jun. 27, 2019.

* cited by examiner

*Primary Examiner* — Christopher J. Novosad
(74) *Attorney, Agent, or Firm* — McKee, Voorhees & Sease, PLC

(57) ABSTRACT

A mountable furrow closing assembly is integrated into a system for closing a furrow including a frame having a forward end and a rearward end and closing wheels. A method utilizing the system to operate an agricultural implement includes opening a furrow, planting a seed in the furrow, and closing the furrow with the system. The system may be assembled by removing existing closing wheels from a first location of a frame of an agricultural implement, operatively attaching the closing wheels at a second location of the frame, and operatively attaching the mountable furrow closing assembly at the first location of the frame.

20 Claims, 21 Drawing Sheets

MOUNTABLE FURROW CLOSING ASSEMBLY

CROSS REFERENCE TO RELATED APPLICATIONS

This application is a by-pass continuation of PCT/US19/22297, filed Mar. 14, 2019, which claims priority under 35 U.S.C. § 119 to provisional patent application U.S. Ser. No. 62/642,639, filed Mar. 14, 2018. The applications are herein incorporated by reference in their entirety, including without limitation, the specification, claims, and abstract, as well as any figures, tables, appendices, or drawings thereof.

FIELD OF THE INVENTION

The present invention relates generally to an accessory for an agricultural implement. More particularly, but not exclusively, the present invention relates to a method, assembly, and system for closing a furrow or seed trench. Even more particularly, but not exclusively, the present invention relates to assemblies and systems that may be universally mounted on almost any agricultural implement and methods for mounting and operating said assemblies and systems.

BACKGROUND OF THE INVENTION

The background description provided herein is for the purpose of generally presenting the context of the present disclosure. Work of the presently named inventors, to the extent the work is described in the present disclosure, as well as aspects of the description that may not otherwise qualify as prior art at the time of filing, are neither expressly nor impliedly admitted as prior art.

Modern agricultural seeding machines are provided with a seed meter for controlling the rate at which seed is applied to a field, and a furrow opener for opening a furrow in the field to which seed from the seed meter is applied. Following the furrow opener are seed firming wheels, press wheels and/or closing wheels. These wheels firm the soil around the seed to obtain good seed-to-soil contact.

Seed firming wheels follow the furrow openers running in the furrow to press the seed into the bottom of the furrow before the seed is covered by closing the furrow. Press wheels are used to firm the soil after the seed has been covered by closing the furrow. Closing wheels serve the dual purpose of closing the furrow and firming the seed bed. Depending on soil conditions, the operator may adjust the downforce applied by the closing wheels.

The closing wheels known in the art are inefficient in this way, as the closing wheels rely too substantially on an operator for proper operation. Typical problems associated with the known closing wheels include the inability to fully close the furrow, thereby leaving the seed exposed to the elements. Thus, there exists a need in the art to improve upon said closing wheels to provide a method, assembly, and system for closing a furrow or seed trench that self-corrects without needing input from the operator.

There also exists a need in the art to provide accessory closing assemblies and systems for more efficiently closing a furrow or seed trench that are universal and installable on agricultural implements manufactured by every major agricultural corporation.

SUMMARY OF THE INVENTION

Therefore, it is a primary object, feature, and/or advantage of the invention disclosed herein to improve on and/or overcome issues associated with that previously known.

It is another object, feature, and/or advantage of the invention to provide an assembly and/or system that includes a cast arm design.

It is another object, feature, and/or advantage of the invention to provide an assembly and/or system that includes a four-linkage design.

It is another object, feature, and/or advantage of the invention to provide an assembly and/or system that mitigates issues associated with continuously providing an appropriate amount of down pressure on the closing wheels and ensuring the furrow or seed trench is properly closed.

It is still yet a further object, feature, and/or advantage of the present invention to provide an assembly and/or system that may be used in a wide variety of applications. For example, the assembly can be used with an agricultural implement manufactured by each major agricultural implement manufacturer.

It is another object, feature, and/or advantage of the invention to provide an assembly and/or system that is durable.

It is another object, feature, and/or advantage of the invention to provide an assembly and/or system that is easily used, manufactured, installed, repaired, and disassembled.

It is another object, feature, and/or advantage of the invention to provide an assembly and/or system that is aesthetically pleasing.

It is another object, feature, and/or advantage of the invention to provide an assembly and/or system that is cost effective.

It is another object, feature, and/or advantage of the invention to provide an assembly and/or system that is safe to operate.

The previous list of objects, features, or advantages of the present invention are not exhaustive and do not limit the overall disclosure. Likewise, the following list of aspects or embodiments do not limit the overall disclosure. It is contemplated that any of the objects, features, advantages, aspects, or embodiments disclosed herein can be integrated with one another, either in full or in part, as would be understood from reading the present disclosure.

According to some aspects of the present disclosure, a system for closing a furrow comprises a frame having a forward end and a rearward end, a mountable furrow closing assembly, and closing wheels closing wheels attached toward the rearward end. The mountable furrow closing assembly comprises a cast arm including a neck portion attached to the frame toward the forward end, a forward disc attached to a first leg portion of the cast arm, and a rearward disc attached to a second leg portion of the cast arm. A body portion of the cast arm connects the first leg portion and the second leg portion to the neck portion. The cast arm may be asymmetrically shaped about every plane capable of traversing a location on or within the cast arm and may further comprise a back portion, ridge, and/or flange integrally formed with and supporting the body portion from the neck portion to the first leg portion and the second leg portion. The first leg portion of the cast arm may be positioned more forwardly than the second leg portion of the cast arm. The cast arm may include mounting apertures in the body portion which may help mount an airbag assembly, a spring assembly, and/or fertilizer tube(s). The fertilizer tube(s) may comprise an inlet operatively connected to a fertilizer supply containing fertilizer and may be configured to dispense said fertilizer through an outlet located aft of at least the forward disc. The closing wheels may be spiked, toothed, or treaded, and/or attached to mounting arms attached to a mounting shell surrounding the rearward end. The system may include a compaction wheel operatively attached to the radial arms through at least a bracket. The radial arms may be attached to the frame at forward apertures of the radial arms and rearward apertures of a left-side plate and a right-side plate of the frame. The left-side plate and the right-side plate of the frame may be separated by a bridge plate welded to the left-side plate and the right-side plate.

According to some other aspects of the present disclosure, a system for closing a furrow includes a frame having a forward end and a rearward end, closing wheels, and a mountable furrow closing assembly attached toward the forward end including discs operatively attached to a lower linkage and side linkages operatively attached to the lower linkage. The mountable furrow closing assembly may include a bridge linkage operatively attached to the side linkages. The system may include a compaction wheel operatively attached to radial arms and/or a compaction wheel is attached to a bracket and the bracket is attached to the radial arms. The radial arms may be attached to the frame at forward apertures of the radial arms and rearward apertures of a left-side plate and a right-side plate of the frame. The left-side plate and the right-side plate of the frame may be separated by a bridge plate welded to the left-side plate and the right-side plate. The closing wheels may be spiked, toothed, treaded, and may be attached to mounting arms. The mounting arms may be attached to a mounting shell surrounding the rearward end.

According to some other aspects of the present disclosure, a mountable furrow closing assembly comprises discs operatively attached to an elongated rigid body. The elongated rigid body is operatively attached to a forward end of a frame of an agricultural implement. The discs may be operatively attached to an elongated rigid body through a disc connection. An airbag assembly or a spring assembly may be mounted to the elongated body. A fertilizer tube may be mounted to the elongated body or the frame. An inlet of the fertilizer tube may be operatively connected to a fertilizer supply containing fertilizer, the fertilizer tube configured to dispense said fertilizer through an outlet located aft of at least one of the discs.

According to some additional aspects of the present disclosure, the elongated body may be a lower linkage. The discs may be attached to the lower linkage at a rearward aperture in the lower linkage. A left-side linkage and a right-side linkage may be attached to the lower linkage at a central aperture in the lower linkage and lower apertures in the left-side linkage and the right-side linkage. A bridge linkage may be attached to the left-side linkage and the right-side linkage at central apertures in the left-side linkage and the right-side linkage and a rearward aperture of the bridge linkage. The lower linkage can have a forward aperture, the left-side linkage and the right-side linkage can have upper apertures, and the bridge linkage can have a forward aperture at which the mountable furrow closing assembly is configured to attach to a frame of an agricultural implement.

According to some alternative aspects of the present disclosure, the elongated rigid body is a cast arm which comprises a neck portion attached to the frame toward the forward end, a first leg portion operatively attached to one of the discs, a second leg portion operatively attached to another one of the discs, and a body portion connecting the first leg portion and the second leg portion to the neck portion. The cast arm may further include any feature or aspect of the present disclosure which was previously described in any of the preceding paragraphs. Additionally, the cast arm may comprise steel.

According to some other aspects of the present disclosure, a method for assembling a system for closing a furrow comprises removing existing closing wheels from a first location of a frame of an agricultural implement, operatively attaching the closing wheels at a second location of the frame, and operatively attaching a mountable furrow closing assembly at the first location of the frame, the mountable furrow closing assembly being a mountable furrow closing assembly described according to any of the aspects listed above. The method may further comprise operatively attaching a compaction wheel to a third location of the frame.

According to some other aspects of the present disclosure, a method for operating an agricultural implement comprises opening a furrow, planting a seed in the furrow, and closing the furrow with a system for closing a furrow. The system may be a system described according to any of the aspects listed above. The method of operation may further comprise driving the agricultural implement through a field and/or mitigating issues associated with obstacles in the field by maintaining a constant down pressure on the assembly with an airbag or a spring.

These or other objects, features, and advantages of the present invention will be apparent to those skilled in the art after reviewing the following detailed description of the illustrated embodiments, accompanied by the attached drawings.

Figure 1:
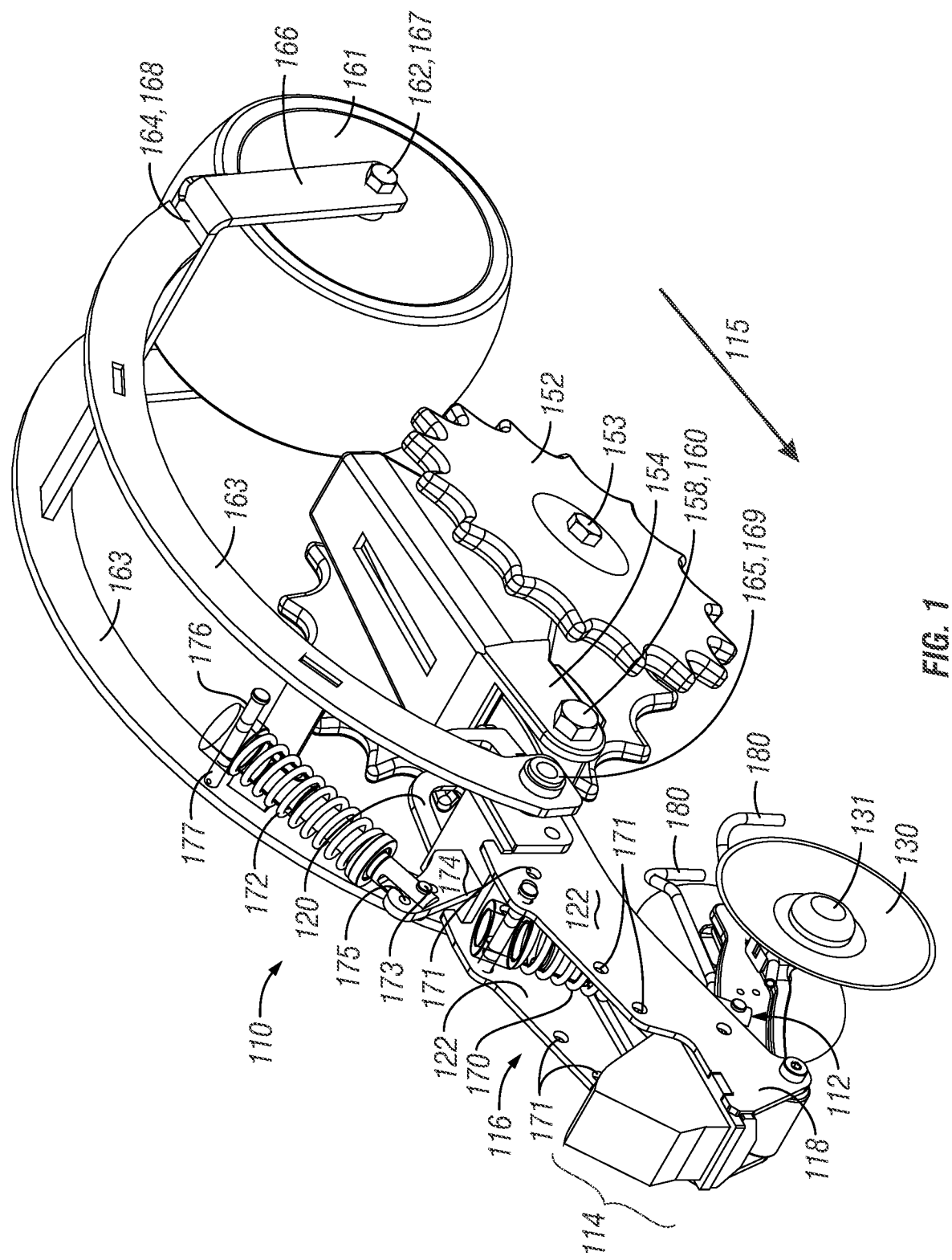
FIG. 1 shows a perspective view of a cast arm design for a system for closing a furrow on an agricultural implement, according to some aspects of the present disclosure.
Figure 2:
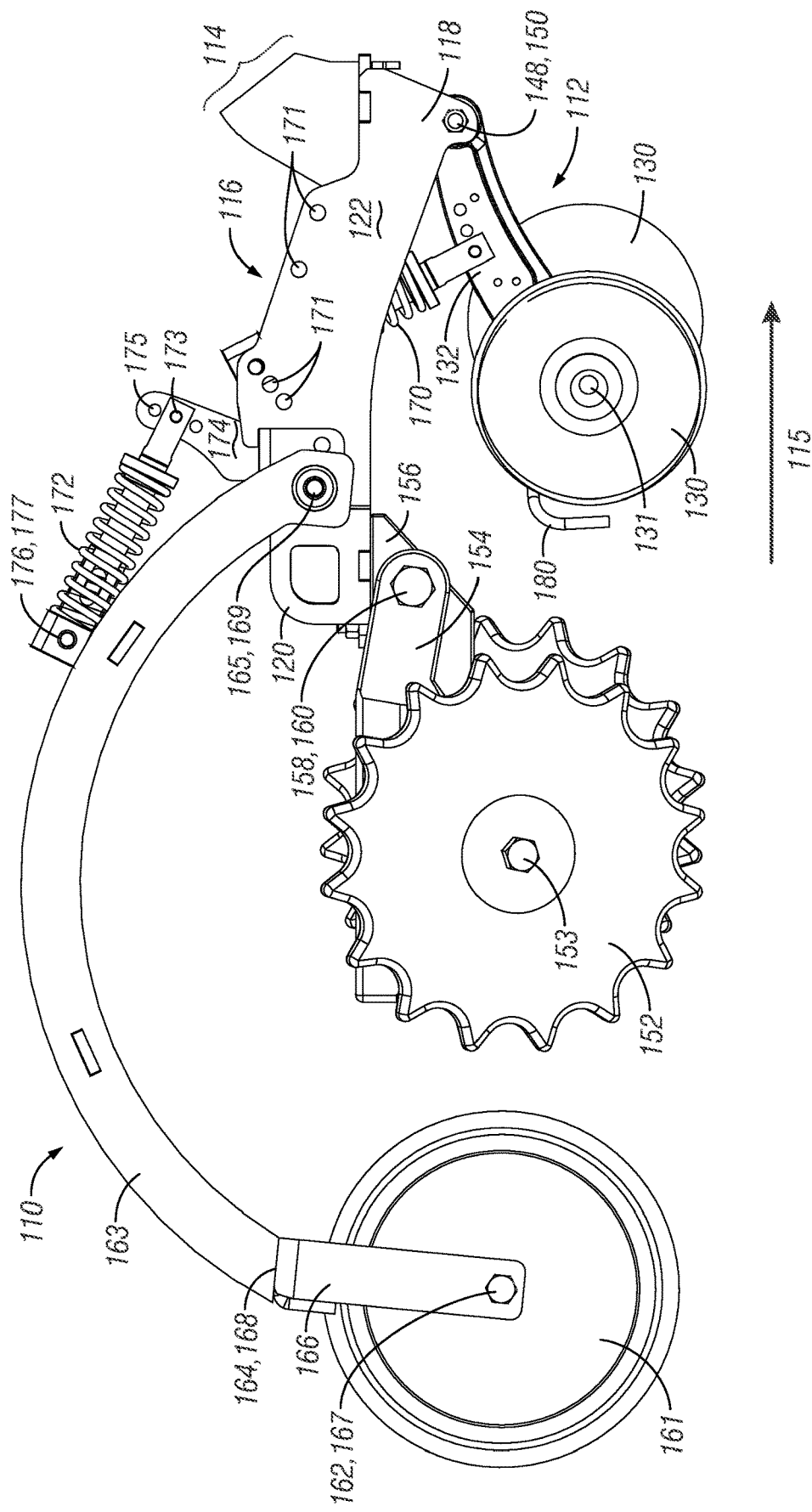
FIG. 2 shows a left-side elevation view of a cast arm design for a system for closing a furrow on an agricultural implement, according to some aspects of the present disclosure.
Figure 3:
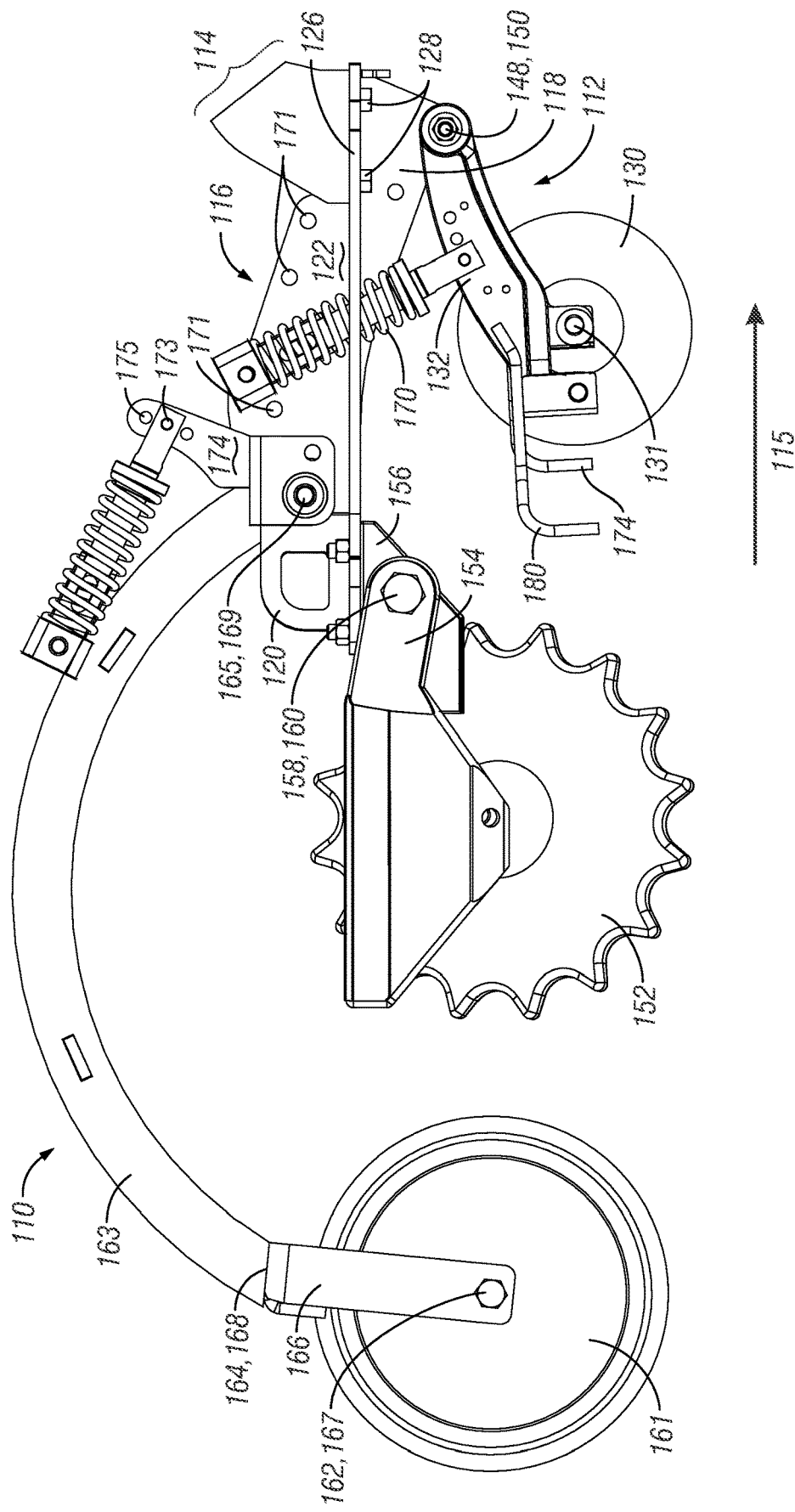
FIG. 3 shows a left-side cutaway view of a cast arm design for a system for closing a furrow on an agricultural implement, according to some aspects of the present disclosure.
Figure 4:
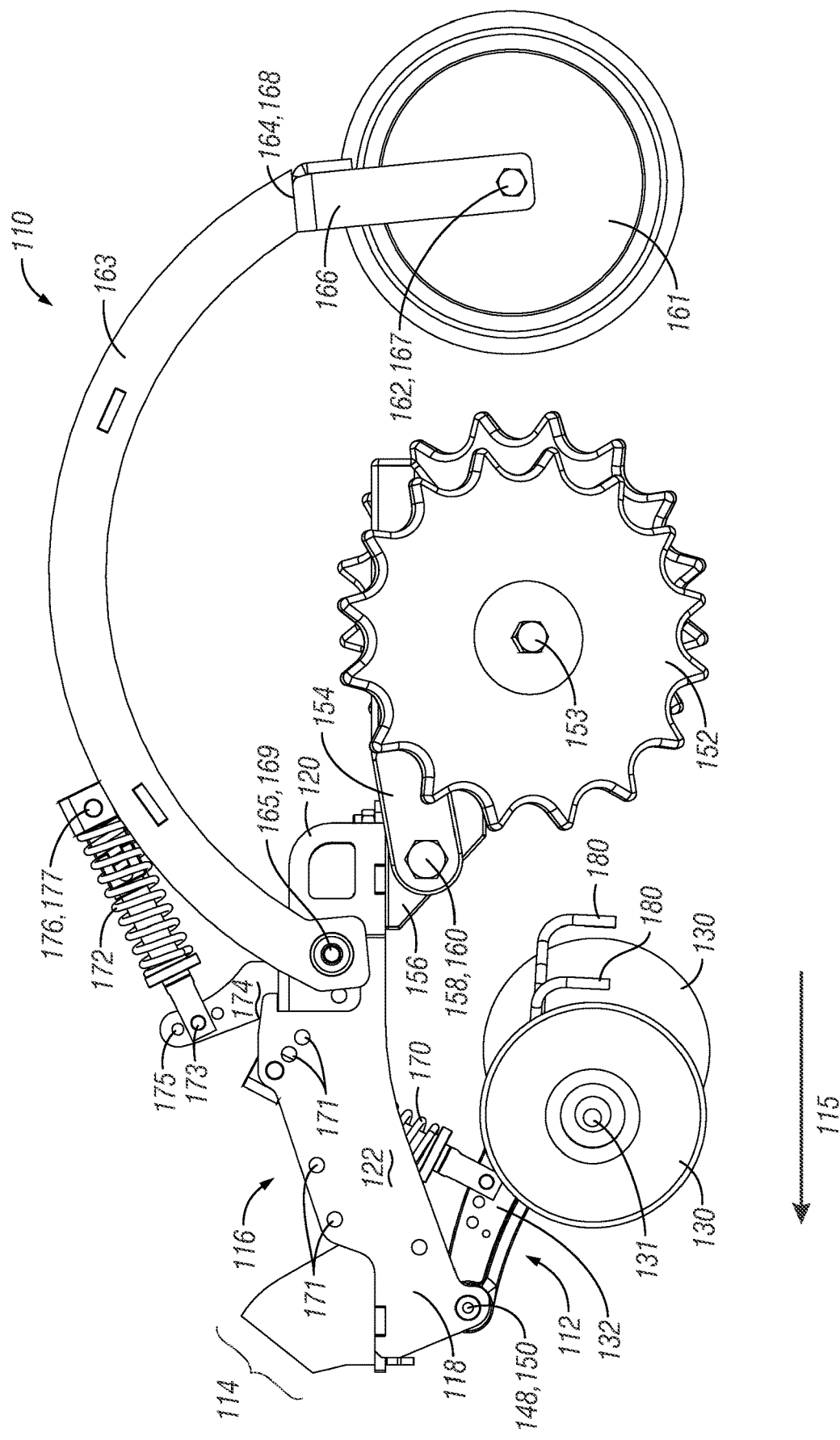
FIG. 4 shows a right-side elevation view of a cast arm design for a system for closing a furrow on an agricultural implement, according to some aspects of the present disclosure.
Figure 5:
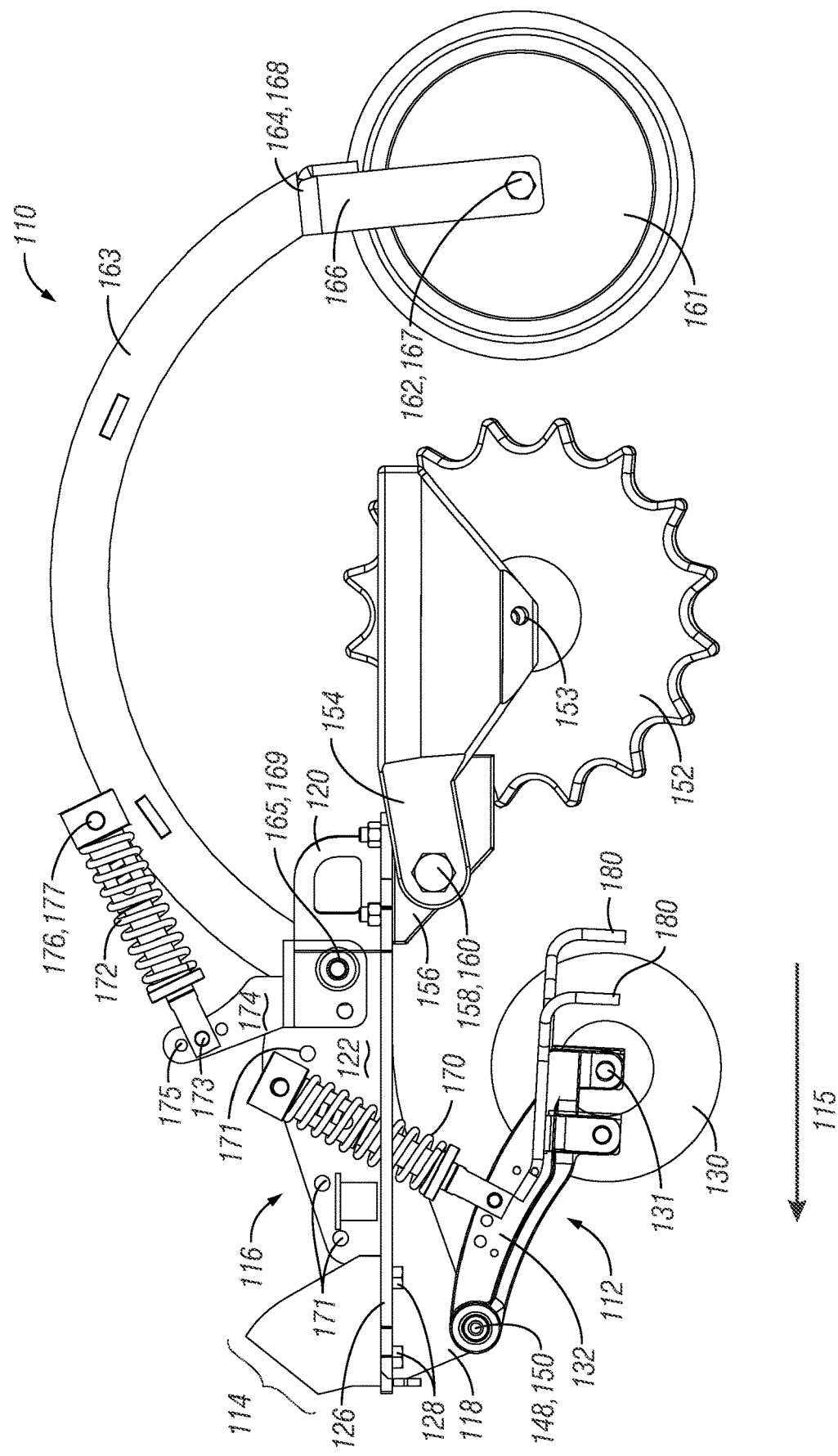
FIG. 5 shows a right-side cutaway view of a cast arm design for a system for closing a furrow on an agricultural implement, according to some aspects of the present disclosure.
Figure 6:
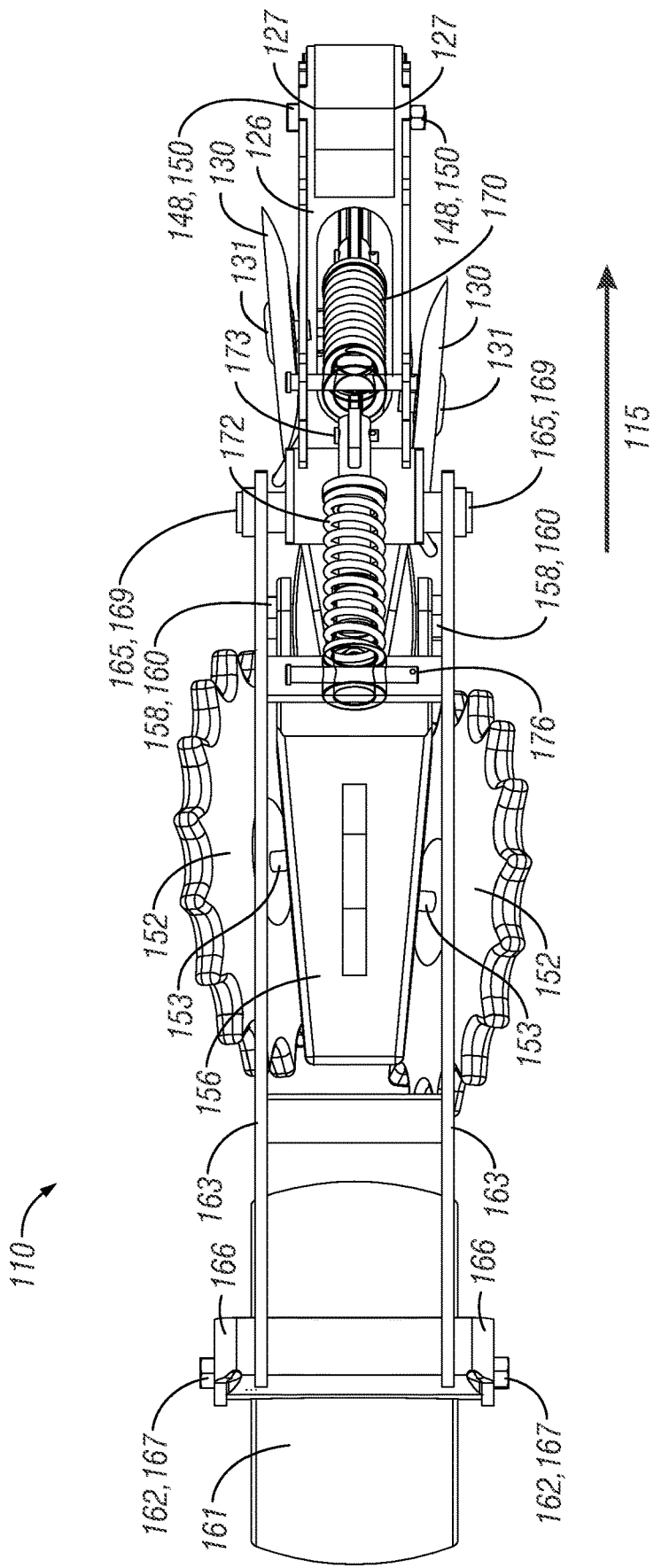
FIG. 6 shows a top elevation view of a cast arm design for a system for closing a furrow on an agricultural implement, according to some aspects of the present disclosure.
Figure 7:
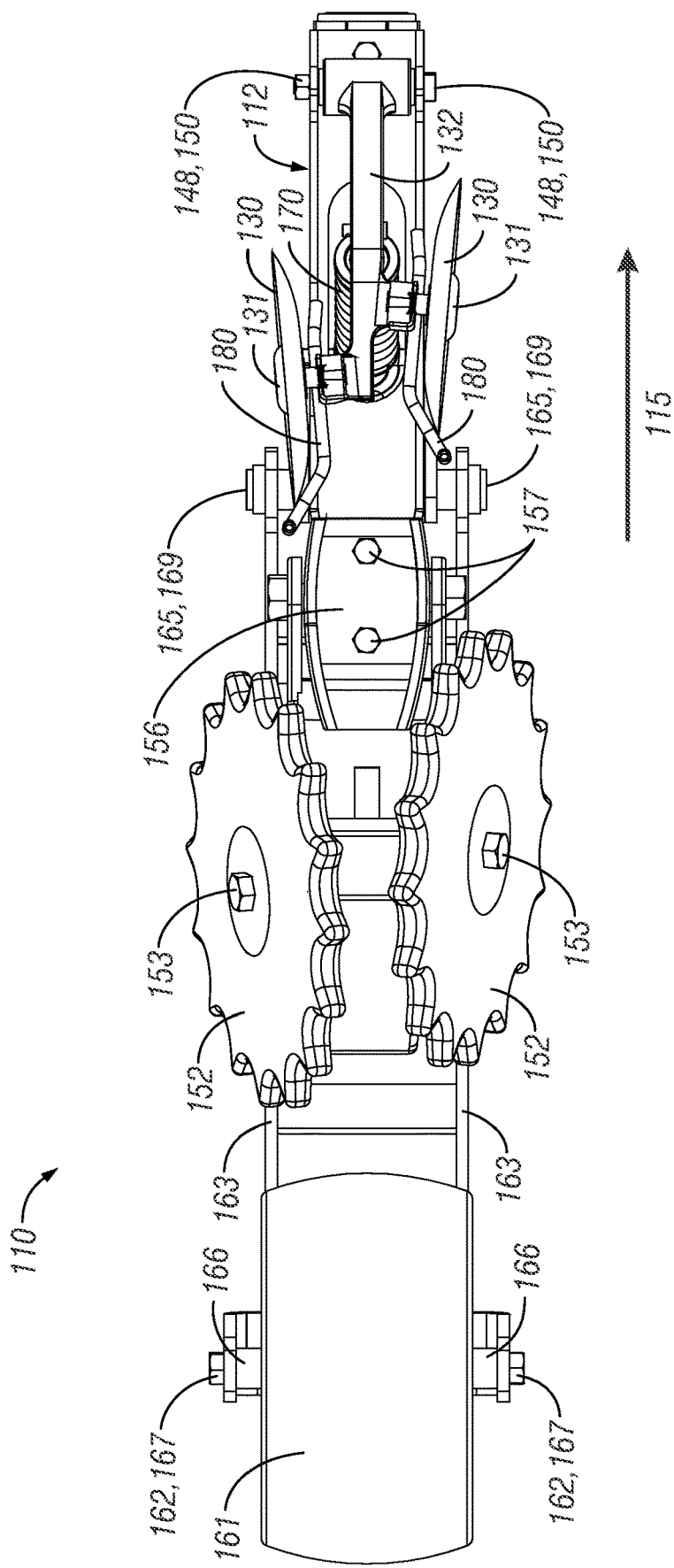
FIG. 7 shows a bottom elevation view of a cast arm design for a system for closing a furrow on an agricultural implement, according to some aspects of the present disclosure.
Figure 8:
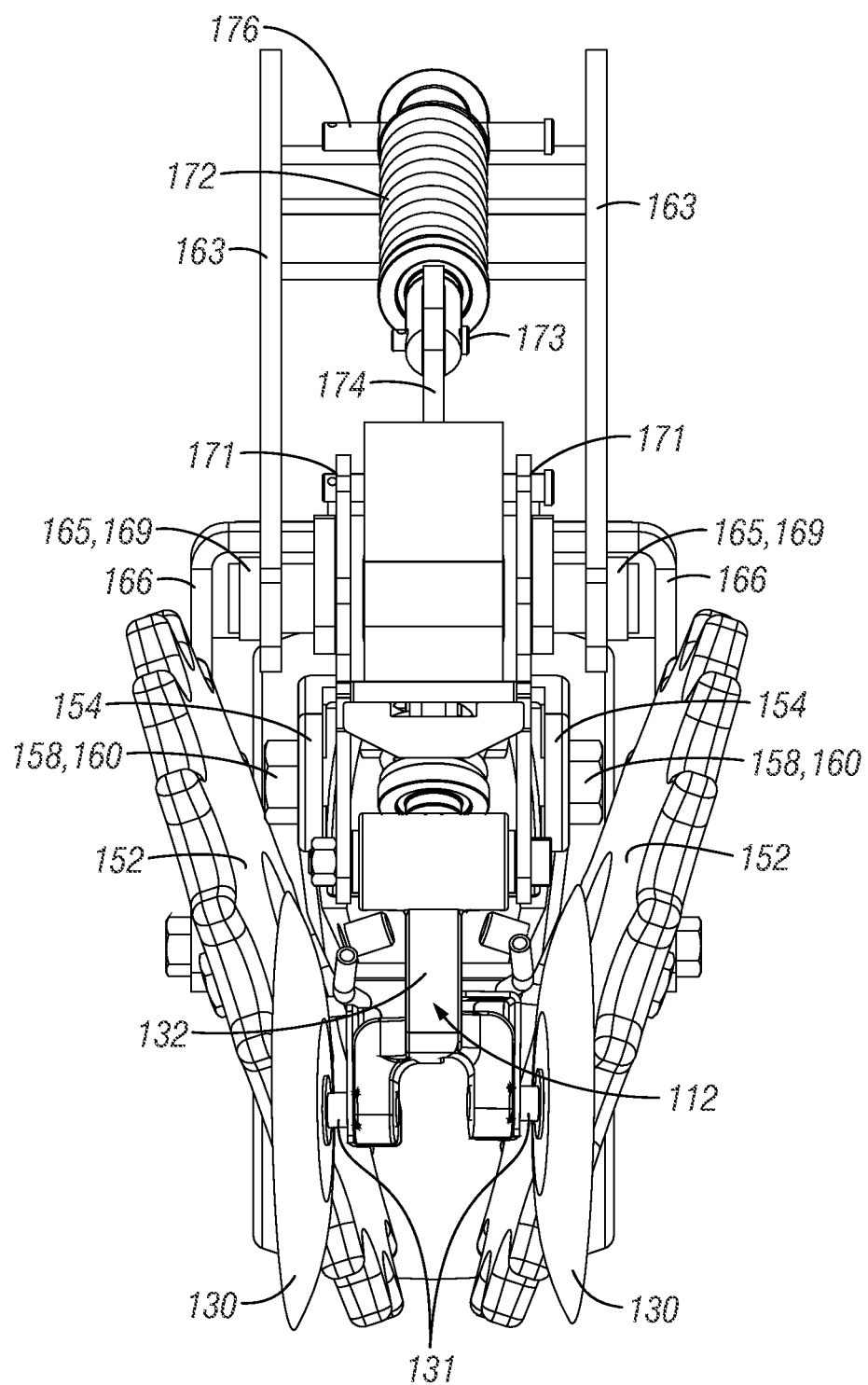
FIG. 8 shows a front elevation view of a cast arm design for a system for closing a furrow on an agricultural implement, according to some aspects of the present disclosure.
Figure 9:
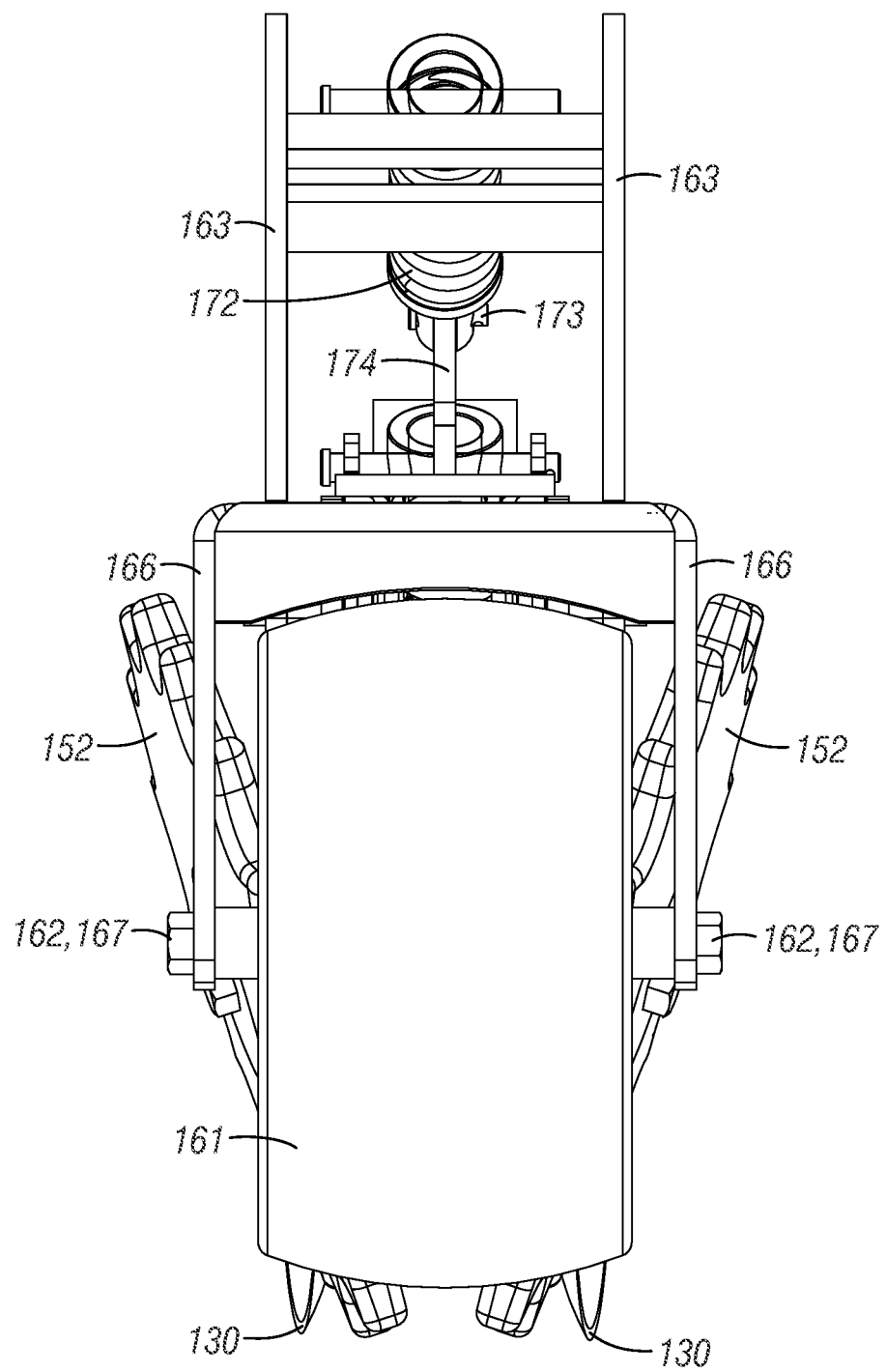
FIG. 9 shows a rear elevation view of a cast arm design for a system for closing a furrow on an agricultural implement, according to some aspects of the present disclosure.
Figure 10A:
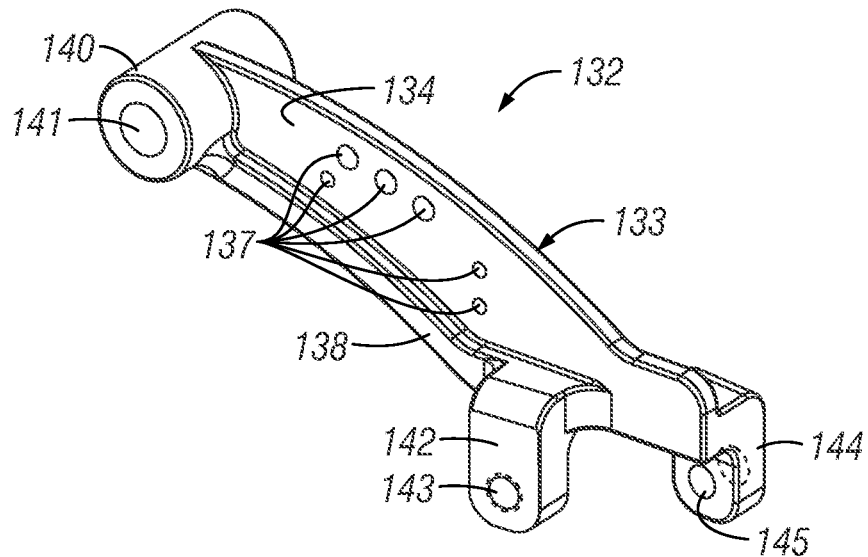
FIG. 10A shows a detailed perspective of a cast arm for the system shown in FIGS. 1-9, according to some aspects of the present disclosure.
Figure 10B:
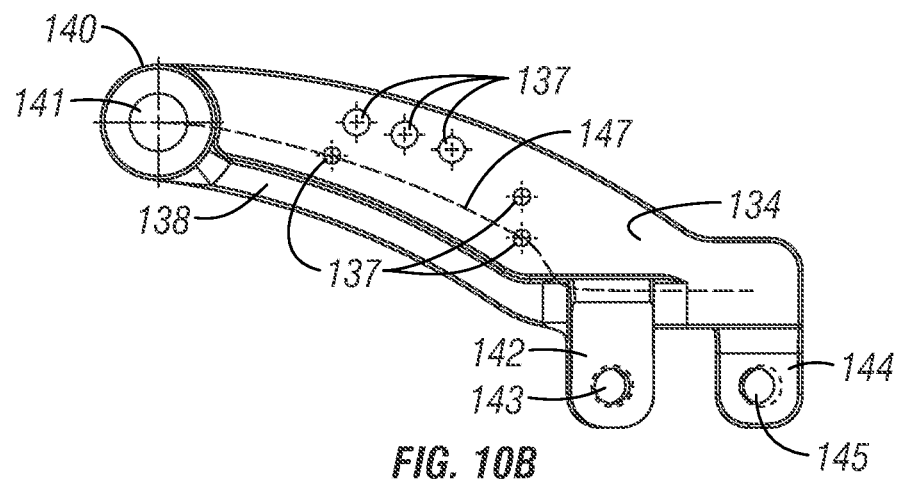
FIG. 10B shows a side elevation view of the cast arm, according to some aspects of the present disclosure.
Figure 10C:
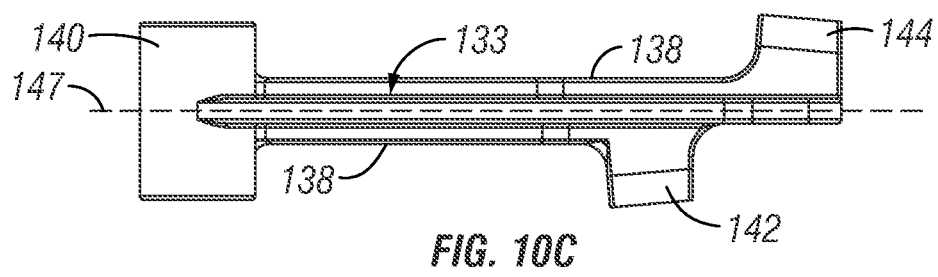
FIG. 10C shows a top elevation view of the cast arm, according to some aspects of the present disclosure.
Figure 10D:
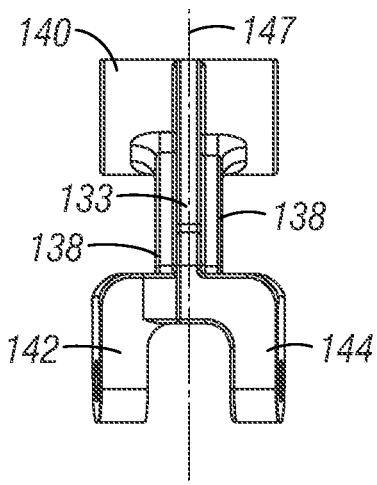
FIG. 10D shows a rear elevation view of the cast arm, according to some aspects of the present disclosure.
Figure 10E:
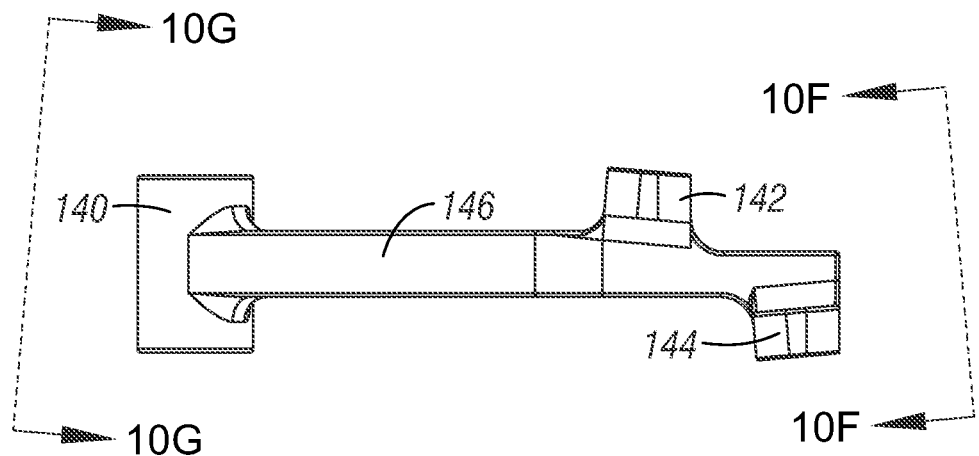
FIG. 10E shows a bottom elevation view of the cast arm, according to some aspects of the present disclosure.
Figure 10F:
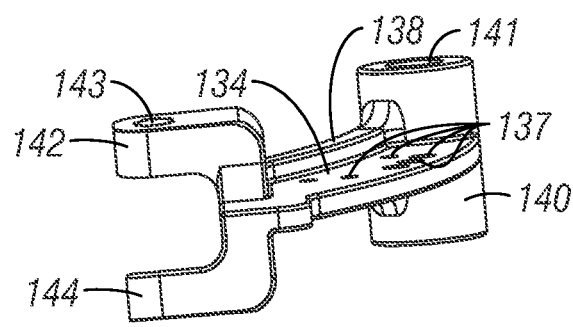
FIG. 10F shows a detailed rear perspective view of the cast arm, according to some aspects of the present disclosure.
Figure 10G:
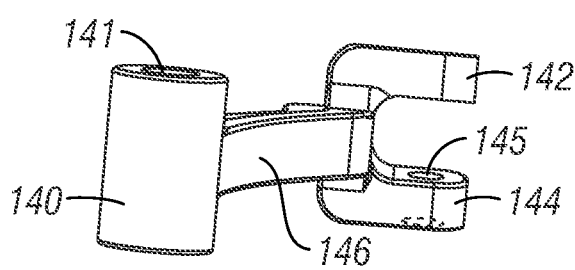
FIG. 10G shows a detailed front perspective view of the cast arm, according to some aspects of the present disclosure.
Figure 11A:
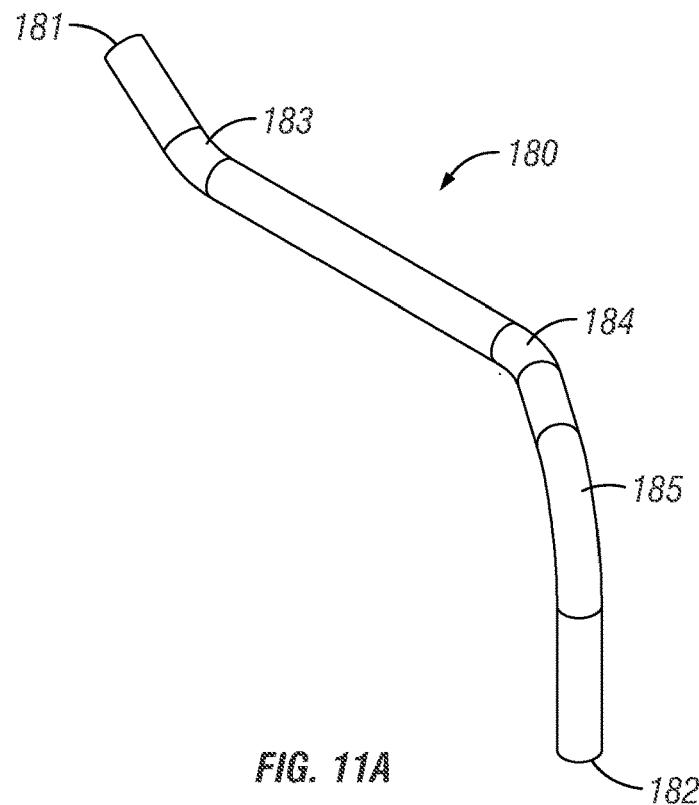
FIG. 11A shows a detailed perspective of a fertilizer tube for the system shown in FIGS. 1-9, according to some aspects of the present disclosure.
Figure 11B:
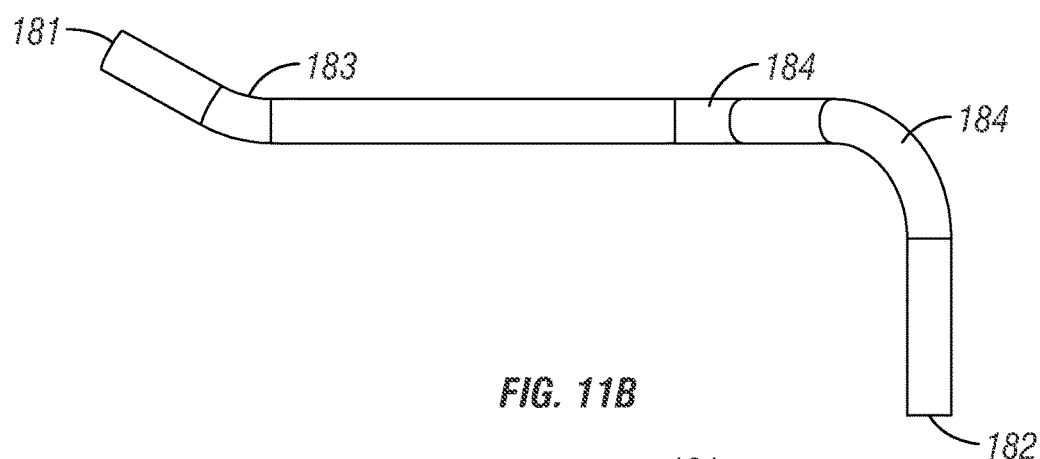
FIG. 11B shows a side elevation view of the fertilizer tube, according to some aspects of the present disclosure.
Figure 11C:
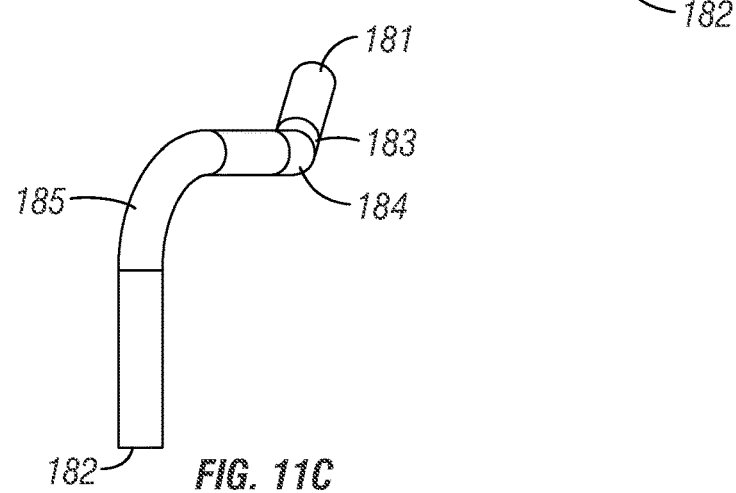
FIG. 11C shows a rear elevation view of the fertilizer tube, according to some aspects of the present disclosure.
Figure 11D:
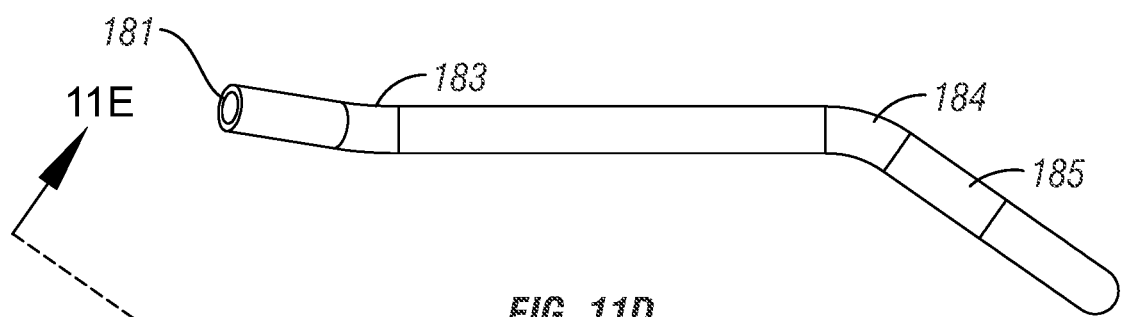
FIG. 11D shows a top elevation view of the fertilizer tube, according to some aspects of the present disclosure.
Figure 11E:
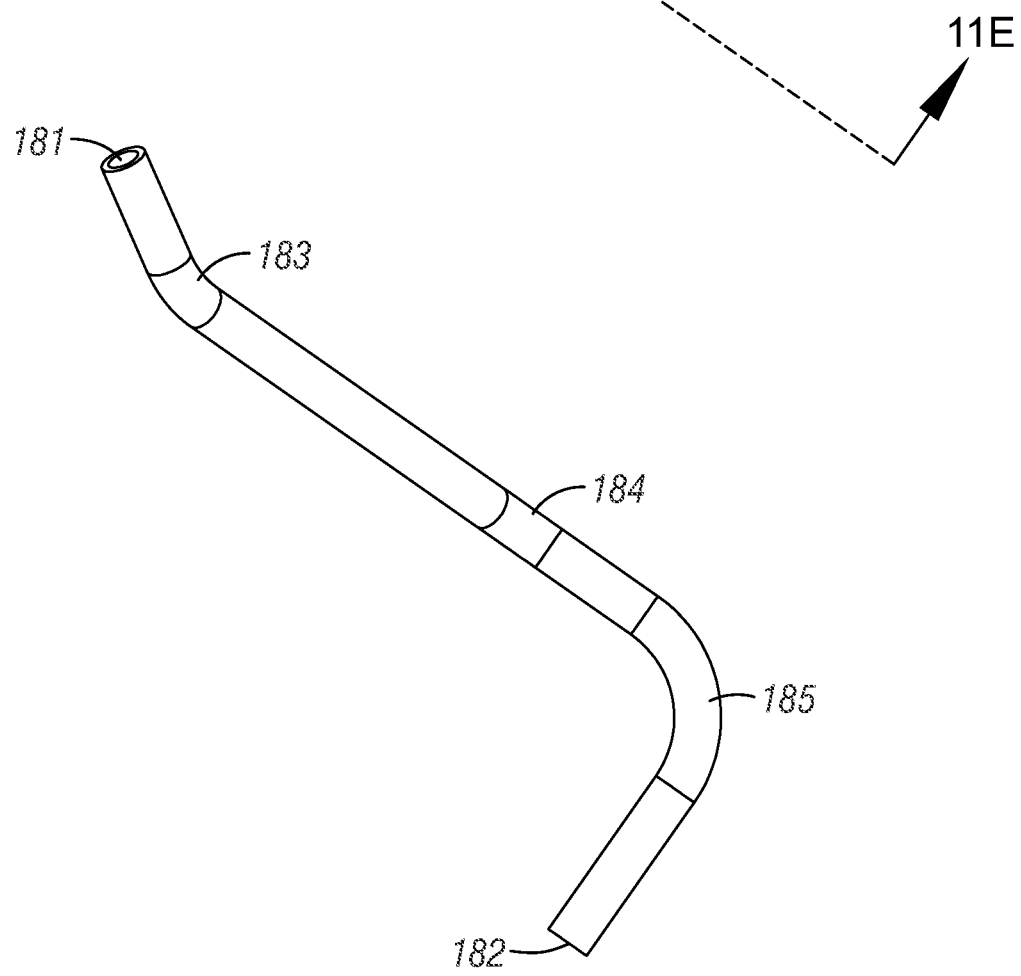
FIG. 11E shows a detailed side perspective view of the fertilizer tube, according to some aspects of the present disclosure.
Figure 12:
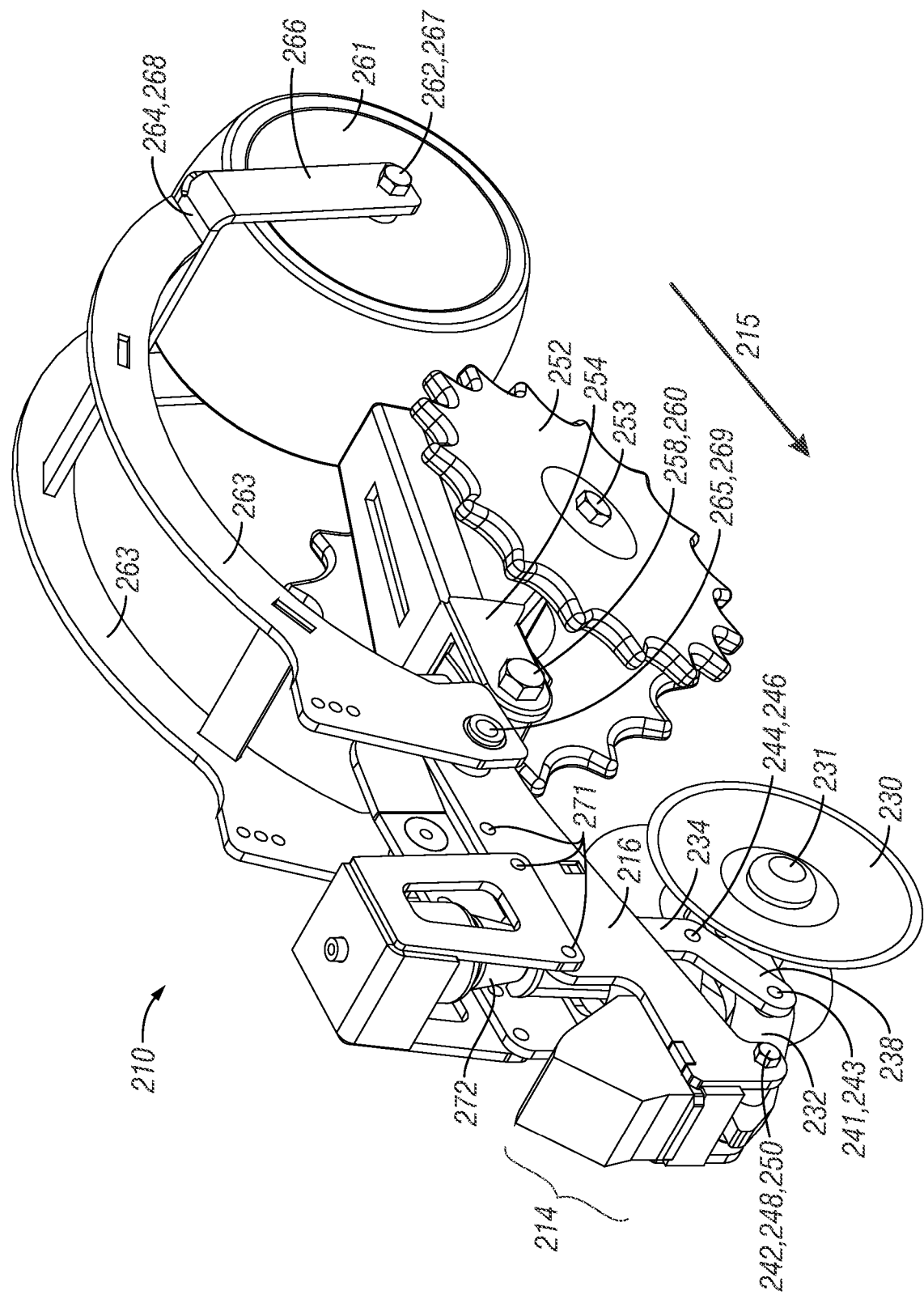
FIG. 12 shows a perspective view of a four-linkage design for a system for closing a furrow on an agricultural implement, according to some aspects of the present disclosure.
Figure 13:
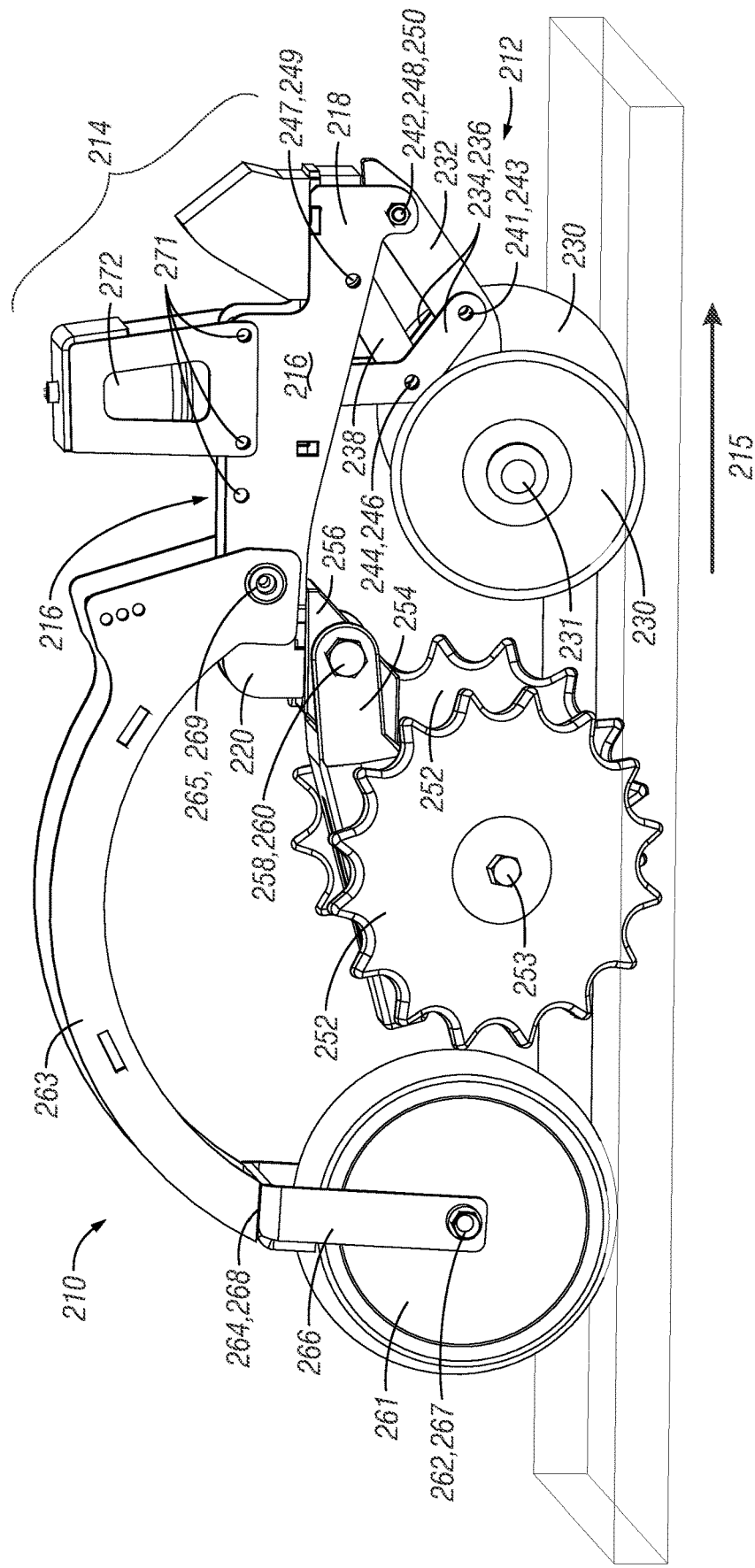
FIG. 13 shows a left-side elevation view of a four-linkage design for a system for closing a furrow on an agricultural implement, according to some aspects of the present disclosure.
Figure 14:
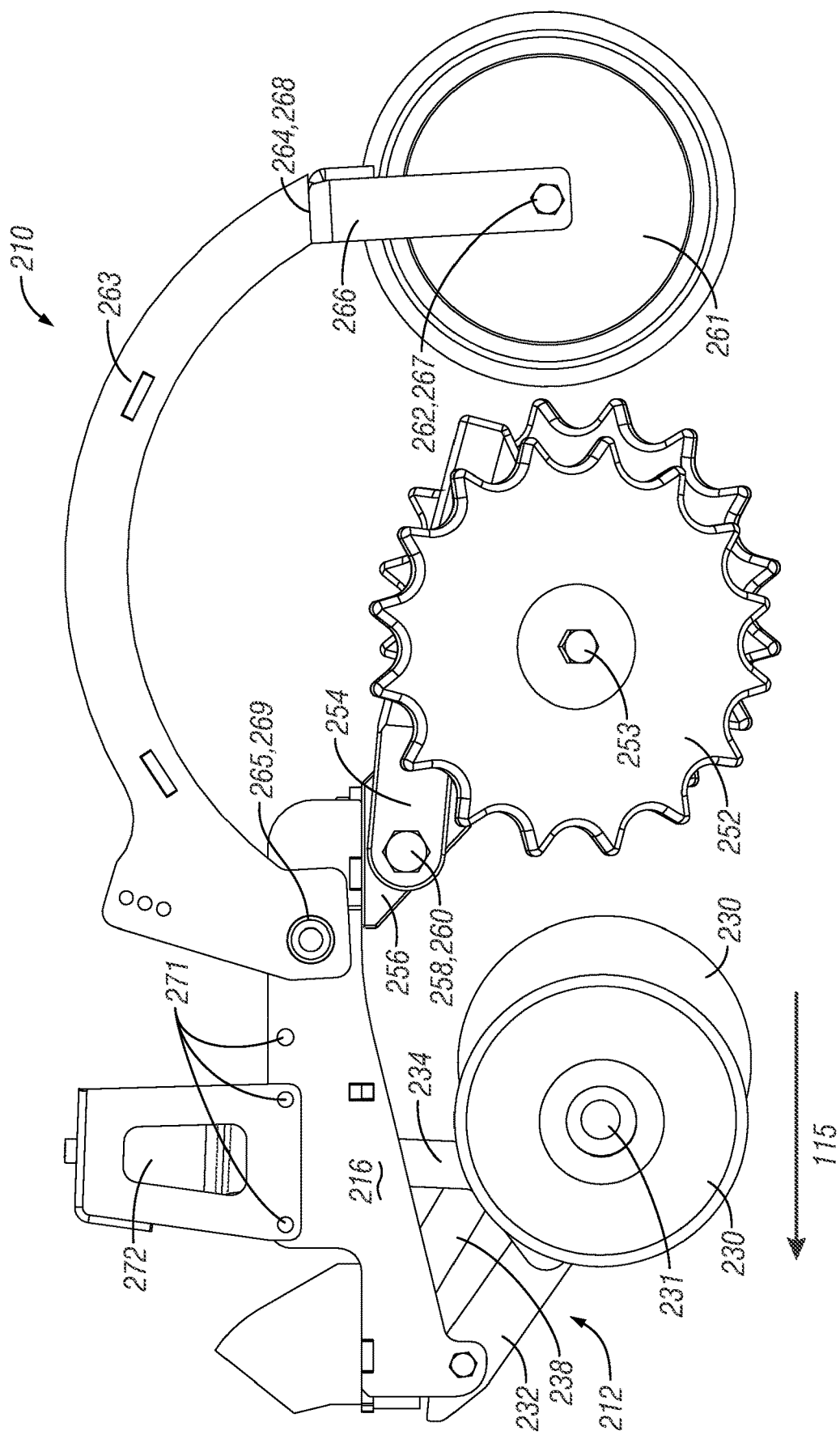
FIG. 14 shows a right-side elevation view of a four-linkage design for a system for closing a furrow on an agricultural implement, according to some aspects of the present disclosure.
Figure 15:
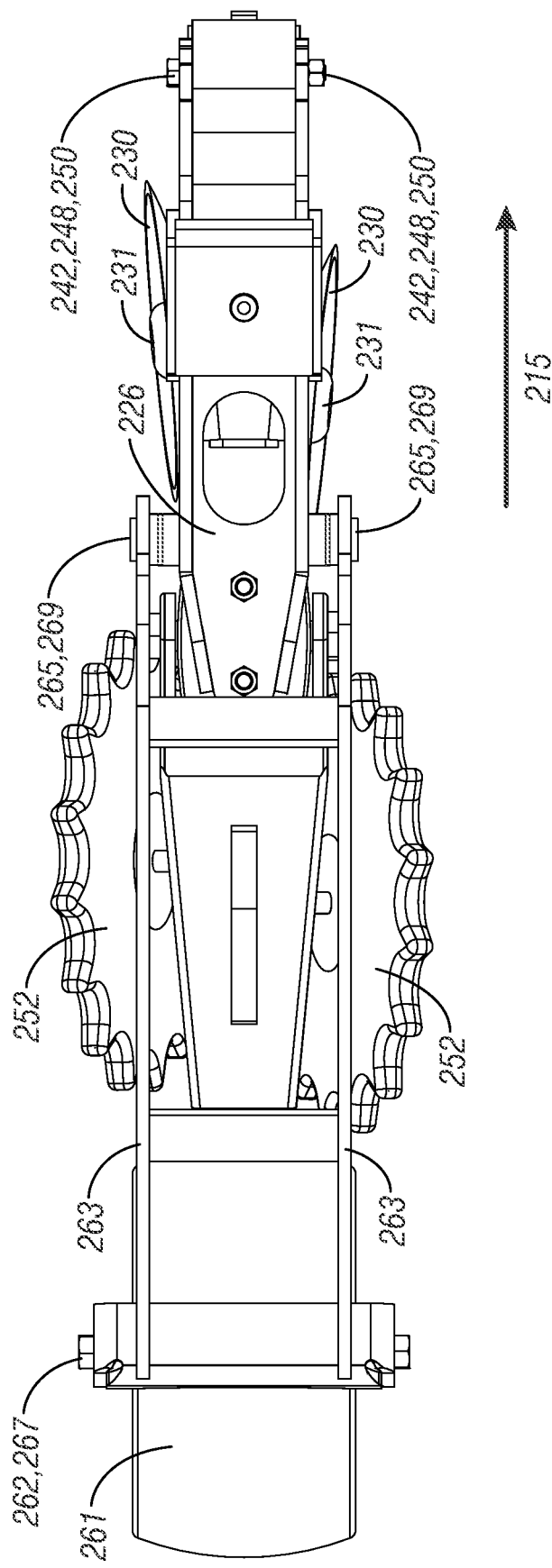
FIG. 15 shows a top elevation view of a four-linkage design for a system for closing a furrow on an agricultural implement, according to some aspects of the present disclosure.
Figure 16:
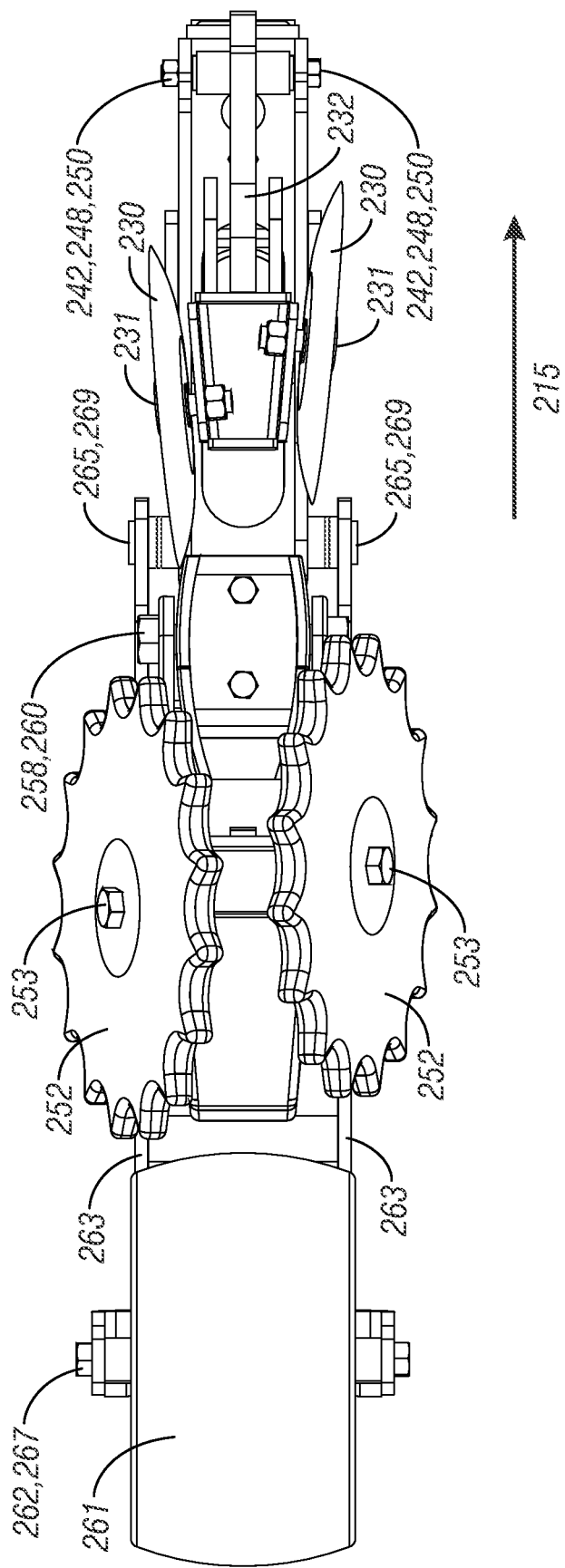
FIG. 16 shows a bottom elevation view of a four-linkage design for a system for closing a furrow on an agricultural implement, according to some aspects of the present disclosure.
Figure 17:
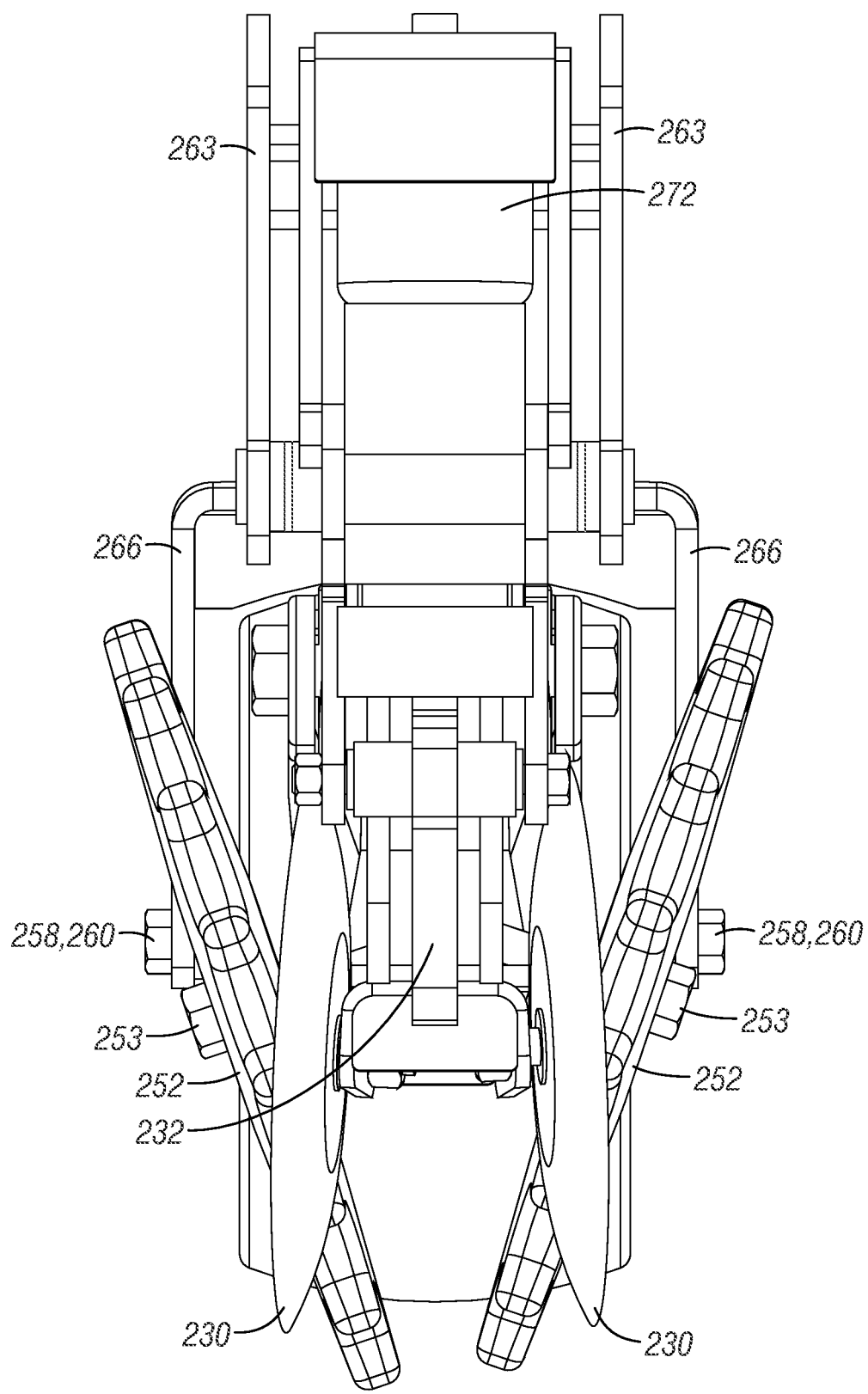
FIG. 17 shows a front elevation view of a four-linkage design for a system for closing a furrow on an agricultural implement, according to some aspects of the present disclosure.
Figure 18:
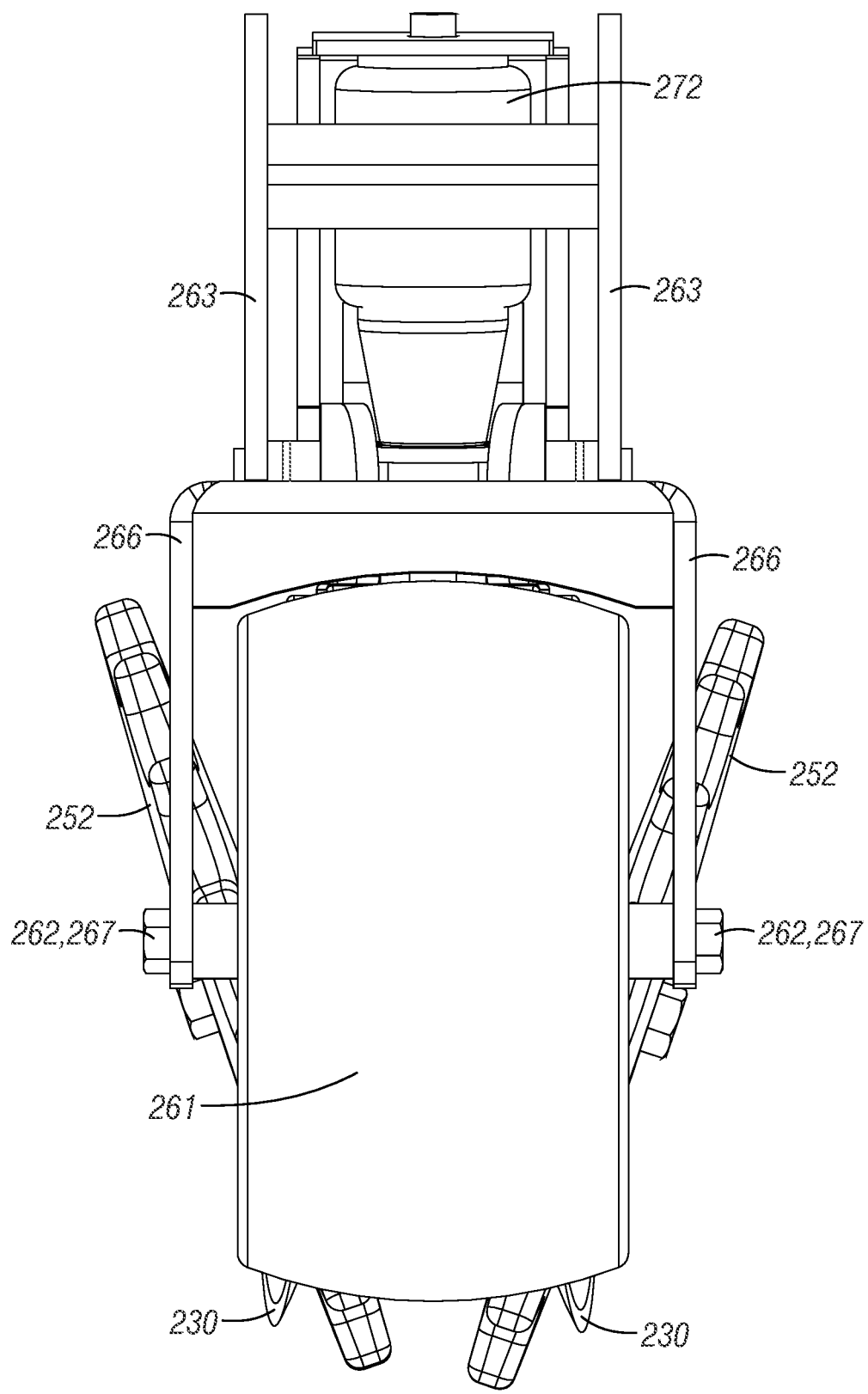
FIG. 18 shows a rear elevation view of a four-linkage design for a system for closing a furrow on an agricultural implement, according to some aspects of the present disclosure.

Various embodiments of the present disclosure illustrate several ways in which the present invention may be practiced. These embodiments will be described in detail with reference to the drawings, wherein like reference numerals represent like parts throughout the several views. Reference to specific embodiments does not limit the scope of the present disclosure and the drawings represented herein are presented for exemplary purposes.

DETAILED DESCRIPTION OF THE PREFERRED EMBODIMENTS

The following definitions and introductory matters are provided to facilitate an understanding of the present invention. Unless defined otherwise, all technical and scientific terms used herein have the same meaning as commonly understood by one of ordinary skill in the art to which embodiments of the present invention pertain.

The terms "a," "an," and "the" include plural referents unless context clearly indicates otherwise. Similarly, the word "or" is intended to include "and" unless context clearly indicate otherwise. The word "or" means any one member of a particular list and also includes any combination of members of that list.

The terms "invention" or "present invention" as used herein are not intended to refer to any single embodiment of the particular invention but encompass all possible embodiments as described in the specification and the claims.

The term "about" as used herein refers to variation in the numerical quantities that can occur, for example, through typical measuring techniques and equipment, with respect to any quantifiable variable, including, but not limited to, mass, volume, time, distance, angle, wave length, frequency, voltage, current, and electromagnetic field. Further, given solid and liquid handling procedures used in the real world, there is certain inadvertent error and variation that is likely through differences in the manufacture, source, or purity of the ingredients used to make the compositions or carry out the methods and the like. The claims include equivalents to the quantities whether or not modified by the term "about."

The term "configured" describes an apparatus, system, or other structure that is constructed to perform or capable of performing a particular task or to adopt a particular configuration. The term "configured" can be used interchangeably with other similar phrases such as constructed, arranged, adapted, manufactured, and the like.

Terms such as first, second, vertical, horizontal, top, bottom, upper, lower, front, rear, forward, rearward, end, sides, concave, convex, and the like, are referenced according to the views presented. These terms are used only for purposes of description and are not limiting unless these terms are expressly included in the claims. Orientation of an object or a combination of objects may change without departing from the scope of the invention.

The term "aft" is used herein to mean "at, near, or toward the rear of an agricultural implement or an agricultural implement component." Other definitions of similar terms will be apparent to those skilled in the art after reading the entirety of the present disclosure.

The apparatuses, systems, and methods of the present invention may comprise, consist essentially of, or consist of the components of the present invention described herein. The term "consisting essentially of" means that the apparatuses, systems, and methods may include additional components or steps, but only if the additional components or steps do not materially alter the basic and novel characteristics of the claimed apparatuses, systems, and methods.

The following embodiments are described in sufficient detail to enable those skilled in the art to practice the invention however other embodiments may be utilized. Mechanical, procedural, and other changes may be made without departing from the spirit and scope of the invention. Accordingly, the scope of the invention is defined only by the appended claims, along with the full scope of equivalents to which such claims are entitled.

FIGS. 1-9 show a cast arm design for a system 110 for closing a furrow or seed trench including a mountable furrow closing assembly 112 (hereinafter assembly 112) for an agricultural implement 114. In FIGS. 1-9 the agricultural implement 114 moves through a field forward in the direction of the arrow 115.

The system 110 includes a frame 116 having a forward end 118 and a rearward end 120. The frame 116 may be constructed from a left-side plate 122 and a right-side plate 124. The left-side plate 122 and the right-side plate 124 of the frame 116 are separated by a bridge plate 126 welded to the left-side plate 122 and the right-side plate. The bridge plate 126 may be positioned near the bottom of the left-side plate 122 and the right-side plate 124. The bridge plate 126 may include a bridge plate connection 127 comprising an aperture, indent, notch, pin, or any other known means for receiving a means for securing two plates of metal to one another. The bridge plate 126 may also include existing bridge plate apertures 128.

The assembly 112 may operatively attach to the frame 116 toward the forward end 118 of the frame 116. More particularly, the assembly 112 may attach to the frame 116 via side plate forward apertures 148 in the left-side plate 122 and the right-side plate 124 of the frame 116. Alternatively, the assembly 112 may attach to the frame 116 via existing bridge plate apertures 128. Included in the assembly 112 are discs 130 (e.g., forward and rearward discs) which are secured to the assembly 112 at disc connection points 131. Nut and bolt assemblies 150, welds, clamps, screws, threaded connections, or any other known means for securing two plates of metal to one another may be used to attach the mountable furrow closing assembly 112 and/or discs 130 to the frame 116. As will be understood from the a full reading of the present disclosure, the assembly 112 allows the use of narrower discs 130 which may be integral to properly closing the furrow and eliminating air gaps. The width and angle of the discs 130 may be adjusted to compensate for different soil conditions and to provide for a range of pressure on the discs 130. The discs 130 may be of any size, but in at least some preferred embodiments have an 8-inch or 9.3-inch diameter with a straight or serrated disc type.

Referring now to FIGS. 10A-10G, the structure of the assembly 112 is made up primarily of a cast arm 132 which vastly improves overall frame strength and increases efficiency by providing a suspension system 110 that independently allows the discs 130 to fracture the side wall and close the furrow or seed trench to allow already existing closing wheels 152 to be more effective.

As is shown, the cast arm 132 can include a neck portion 140 attached to the frame 116 toward the forward end 118, a first leg portion 142 operatively attached to the forward disc 130, a second leg portion 144 operatively attached to the rearward disc 130, a body portion 133 connecting the first leg portion 142 and the second leg portion 142 to the neck portion 140, and a back portion, ridge, or flange 138 integrally formed with (e.g. casted with molten steel) and supporting the body portion 133 from the neck portion 140 to the first leg portion 142 and the second leg portion 144.

The cast arm 132 is asymmetrically shaped about every plane (e.g. x-y plane, y-z plane, x-z plane, or some combination thereof) capable of traversing a location on or within the cast arm 132. In other words, the cast arm 132 (including the neck portion 140, leg portions 142, 144, etc.) is shaped and configured such that the cast arm 132 cannot be cut in half to form two identical pieces. The unique shape of the cast arm 132 is why it is particularly advantageous to utilize a casting process. Using a casting process allows for the cast arm 132 to be easily reproduced with only a single mold.

The shape and density of the material(s) which makes up the cast arm 132 affect a centerline 147 traverses the body portion of the cast arm from a forward location to a rearward location. By definition, an equal amount of mass is located above and below the centerline 147 with respect to the z-axis. The centerline 147 shown in FIGS. 10A-10G is for exemplary purposes. The illustrated shape is not meant to limit the claims beyond the plain and ordinary meaning of the words contained therein.

The centerline 147 preferably includes at least one inflection point (i.e., the center line switches from a concave curve to a convex curve at least once) with respect to the z-axis (e.g., orthogonal direction corresponding to the height) of the implement. The at least one inflection point should occur at a central location between where the neck portion 140 attaches to the frame 116 (resulting in a first load being placed on the cast arm 132, the load being static if the implement is not traveling through a field and dynamic if the implement is traveling through a field) and where the leg portion(s) 142/144 attach to the closing wheel(s) 130 (resulting in a second load being placed on the cast arm 132, the load being static if the implement is not traveling through a field and dynamic if the implement is traveling through a field). The inflection point will help the cast arm 132 withstand the first and second loads placed on the cast arm 132 without failing better than if a single curved piece with a vertex or a single substantially straight piece were used.

Figure 19:
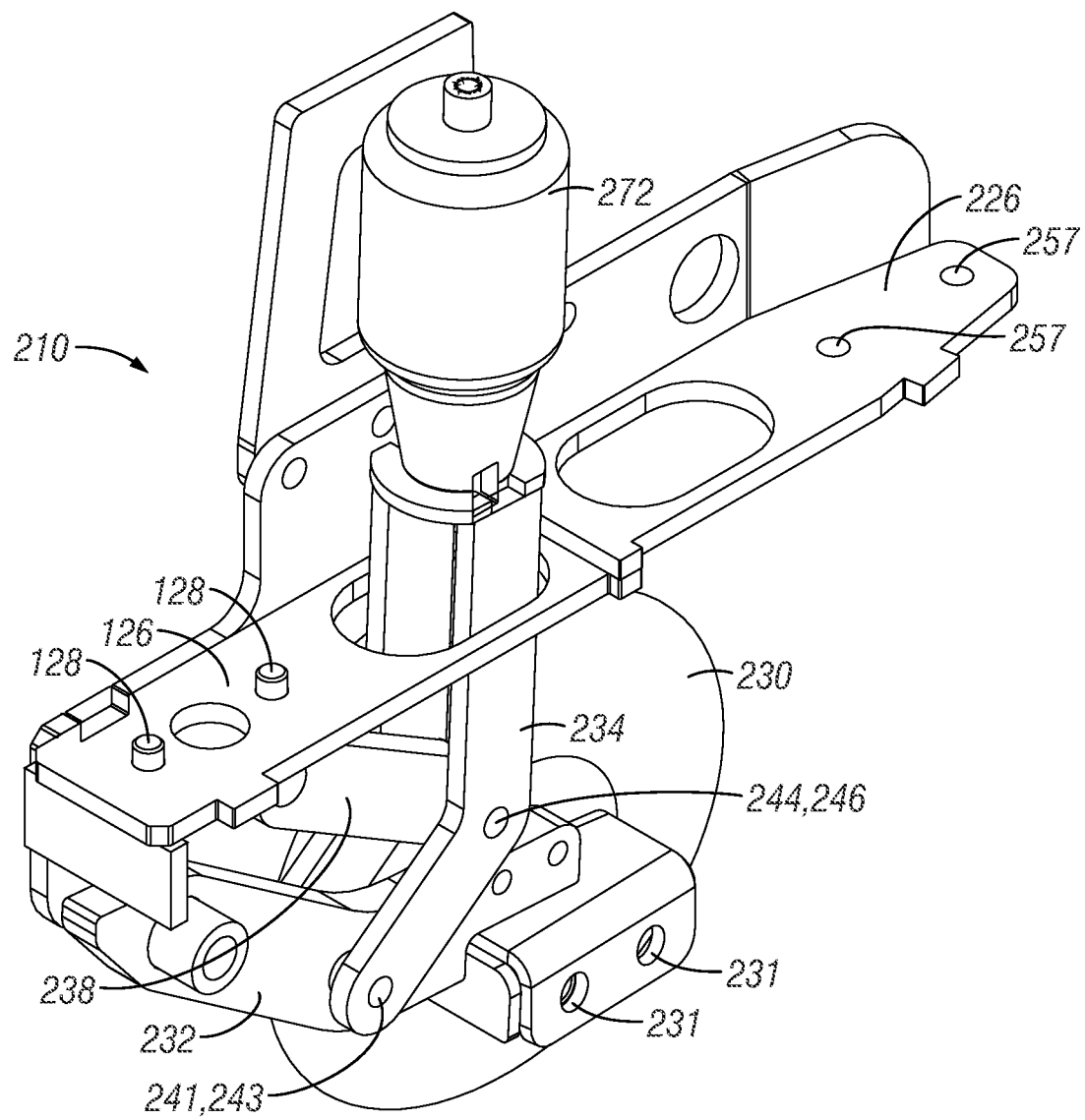
FIG. 19 shows a perspective cutaway view of the four-linkage design which includes an airbag assembly, according to some aspects of the present disclosure.

The cast arm 132 typically includes mounting apertures 137 in the body portion 133 which may allow for the mounting of an airbag or a first spring 170 for mitigating issues associated with obstacles in the field by maintaining a constant down pressure on the assembly 112. The first spring 170 is typically mounted to the frame 116 to mount to the cast arm 132 at side plate upper apertures 171, however could also attach directly to the bridge plate 126 or a smaller component which links to the side plates 122, 124. In an alternative example, an airbag (such as airbag 272 of FIG. 19), may be included in an airbag assembly secured to the frame 116 via side plate upper apertures 171 or through a direct attachment to the bridge plate 126.

The first spring 170 may optionally be used in conjunction with a second spring 172 for a more pronounced effect. The second spring 172 can be positioned at a substantially different angle than the first spring to more efficiently handle lateral and vertical forces which affect the implement 114. The second spring 172 typically mounts to the frame 116 through a second spring connection point 173 which attaches to at least one adjoining plate aperture 175 in an adjoining plate 174. The adjoining plate 174 preferably carries multiple apertures 175, just as the sides plates 122/124 have multiple side plate upper apertures 171 so that the position of the first and/or second springs 170/172 can be adjusted independently or in relation to one another. This helps the springs 170/172, which may or may not be used in conjunction with an airbag assembly, account for a wide range of forces so that the implement can be adapted to serve a variety of different fields with varying terrain.

At the other end, the second spring 172 may be secured with an adjoining pin 176 at an adjoining pin connection point 177. The adjoining pin 176 is preferably a machined pin with a larger head rather than that a standard bolt to improve the durability of the spring assembly. Near, at, or within the adjoining pin 176, there can be vertical slots which allow dirt to escape in an effort to reduce binding on the spring assembly and the overall system 110.

The system 110 may also include closing wheels 152. The closing wheels 152 may be spiked, toothed, treaded, or the like to assist in closing the furrow. The closing wheels 152 may operatively attach to the frame 116 toward the rearward end 120 of the frame 116. The closing wheels 152 may be attached via to mounting arms 154 via closing wheel connection points 153 and mounting arm first connection points 155. The mounting arms 154 may be attached to a mounting shell 156 surrounding the rearward end 120 of the frame 116 at mounting shell connection points 157 and mounting arm second connection points 158. The closing wheels 152, mounting components 154, 156, and the frame 116 may attach through the use of nut and bolt assemblies 160, welds, clamps, screws, threaded connections, or any other known means for securing two plates of metal or an agricultural component of an agricultural implement 114 to each other.

The system 110 may also include a compaction wheel 161 operatively attached to radial arms 163. More specifically, the compaction wheel 161 may be attached to a bracket 166 at a compaction wheel connection point 162 and a first bracket connection point 167. In such an embodiment, the bracket 166 may be attached to the radial arms 163 at a second bracket connection point 168 and a first radial arm connection point 164. The radial arms 163 may be attached to the frame 116 via a second radial arm connection points 165 and side plate rearward apertures 169.

The system 110 may also include fertilizer tube(s) 180 mounted to the cast arm 132 through at least one of the mounting apertures 137 or, alternatively, to a component of the frame 116 such as the bridge plate 126. As particularly shown in FIGS. 11A-11E, the fertilizer tube(s) 180 preferably include an inlet 181 which is operatively connected to a fertilizer supply containing fertilizer. The fertilizer tube 180 shown is configured to dispense said fertilizer through an outlet 182 located aft of at least the forward disc 130. While the fertilizer tube(s) 180 may comprise any shape which allow for the fertilizer tube(s) 180 to carry out the aforementioned intended function, the fertilizer tube may preferably include an inner bend 183, an outer bend 184, and a lower bend 185. The inner bend 183 is at least partially responsible for providing the fertilizer tube(s) 180 a location in which the fertilizer tube(s) 180 may be easily mounted to the cast arm 132 or frame 116. The outer bend 184 is at least partially responsible for providing enough space between the fertilizer tube(s) 180 and the discs 130 if the inlet(s) 181 is located forward of the corresponding disc 130 and the outlet(s) 182 is located aft of the corresponding disc 130. In other words, the outer bend 184 bends the fertilizer tube(s) 180 out and away from the discs 130. The lower bend 185 is primarily responsible for placing the outlet 182 as close as possible to the intended area in the field to be fertilized.

According to other aspects of the present disclosure, a method for assembling the system 110 includes removing existing closing wheels 152 from a first location of a frame of an agricultural implement and attaching the closing wheels 152 at a second location of the frame. For example, on a Deere-brand agricultural implement, the closing wheels 152 may initially be attached to the frame 116 near the forward end 118 of the frame 116 and may be translated rearward and attached to the rearward end 120 of the frame 116 such that there is more distance created between the closing wheels 152 and the mechanism for opening the furrow (such as opening wheels, a shank, etc.) on the agricultural implement 114. The method also includes attaching the assembly 112 at the first location of the frame 116, effectively "replacing" the closing wheels 120. As noted above, the assembly 212 preferably includes discs 130 operatively attached to a cast arm 132 which mounts at a forward end 118 of the frame 120. The method may also include operatively attaching a compaction wheel 161 at a third location of the frame 116. Utilizing the above method aids in providing an operator with a mountable furrow closing assembly that is universal and installable on agricultural implements manufactured by every major agricultural corporation.

According to other aspects of the present disclosure, a method for operating an agricultural implement, such as agricultural implement 114, includes opening a furrow, planting a seed in the furrow, and closing the furrow with a system for closing a furrow, such as system 110. The method may also include driving the agricultural implement 114 through a field, mitigating issues associated with obstacles in the field by maintaining a constant down pressure on the system with an airbag or a spring 170/172, dispensing fertilizer with fertilizer tubes 180 that are integrated into the system 110, and firming soil with the compaction wheel 161. Numerous different types of seed or fertilizer may be utilized by the agricultural implement 114 in conjunction with the system 110 and the assembly 112.

FIGS. 12-19 show a four-linkage design for a system 210 for closing a furrow or seed trench including a mountable furrow closing assembly 212 (hereinafter assembly 212) for an agricultural implement 214. In FIGS. 12-19 the agricultural implement 214 moves through a field forward in the direction of the arrow 215.

The system 210 includes a frame 216 having a forward end 218 and a rearward end 220. The frame 216 may be constructed from a left-side plate 222 and a right-side plate 224. The left-side plate 222 and the right-side plate 224 of the frame 216 are separated by a bridge plate 226 welded to the left-side plate 222 and the right-side plate. The bridge plate 226 may be positioned near the bottom of the left-side plate 222 and the right-side plate 224 and may include existing bridge plate apertures 228.

The assembly 212 may operatively attach to the frame 216 toward the forward end 218 of the frame 216. Discs 230 may attach to a lower linkage 232. The lower linkage 232 may have a lower linkage rearward aperture 240, a lower linkage central aperture 241, and a lower linkage forward aperture 242. A left-side linkage 234 and a right-side linkage 236 may be mirror images of another and may have side linkage lower apertures 243, side linkage central apertures 244, and side linkage upper apertures 245. The side linkages 234, 236 may attach to the lower linkage 232 via the lower linkage central aperture 241 and the side linkage lower apertures 243. The assembly 212 may include a bridge linkage 238 having a bridge linkage rearward aperture 246 and a bridge linkage forward aperture 247. The bridge linkage 238 may attach to the side linkages 234, 236 via the side linkage central apertures 244 and the bridge linkage rearward aperture 246. Nut and bolt assemblies 250, welds, clamps, screws, threaded connections, or any other known means for securing two plates of metal to one another may be used to attach each of the components 232, 234, 236, 238 of the mountable furrow closing assembly 212 to one another.

Furthermore, to ensure safe operation of the implement 214, the discs 230 may attach to the lower linkage 232 via the lower linkage rearward aperture 240 and a disc connection point 231. The lower linkage 232 may attach to the frame 216 via a side plate forward apertures 248, the left-side linkage 234 and the right-side linkage 236 may attach to the frame 216 via the side linkage upper apertures 245 and a bridge plate connection 227, and the bridge linkage 238 may attach to the frame 216 via the bridge linkage forward aperture 247 and side plate central apertures 249. Nut and bolt assemblies 250, welds, clamps, screws, threaded connections, or any other known means for securing two plates of metal to one another may be used to attach each of the components 232, 234, 236, 238 of the mountable furrow closing assembly 212 to the frame 216. The bridge plate connection 227 may comprise an aperture, indent, notch, pin, or any other known means for receiving a means for securing two plates of metal to one another. Alternatively, the present disclosure also contemplates the left-side linkage 234 and the right-side linkage 236 may attach directly to the left-side plate 222 and the right-side plate 224 of the frame 216.

The position of the components 232, 234, 236, 238 of the assembly 212 vastly improves overall frame strength and increases efficiency by providing a suspension system 210 that independently allows the discs 230 to fracture the side wall and close the furrow or seed trench to allow already existing closing wheels 252 to be more effective. Additionally, the assembly 212 allows the use of narrower discs 230 which may be integral to properly closing the furrow and eliminating air gaps. The width and angle of the discs 230 may be adjusted to compensate for different soil conditions and to provide for a range of pressure on the discs 230. The discs 230 may be of any size, but in at least some preferred embodiments have an 8-inch or 9.3-inch diameter with a straight or serrated disc type.

The system 210 may also include closing wheels 252. The closing wheels 252 may be spiked, toothed, treaded, or the like to assist in closing the furrow. The closing wheels 252 may operatively attach to the frame 216 toward the rearward end 220 of the frame 216. The closing wheels 252 may be attached via to mounting arms 254 via closing wheel connection points 253 and mounting arm first connection points 255. The mounting arms 254 may be attached to a mounting shell 256 surrounding the rearward end 220 of the frame 216 at mounting shell connection points 257 and mounting arm second connection points 258. The closing wheels 252, mounting components 254, 256, and the frame 216 may attach through the use of nut and bolt assemblies 260, welds, clamps, screws, threaded connections, or any other known means for securing two plates of metal or an agricultural component of an agricultural implement 214 to each other.

The system 210 may also include a compaction wheel 261 operatively attached to radial arms 263. More specifically, the compaction wheel 261 may be attached to a bracket 266 at a compaction wheel connection point 262 and a first bracket connection point 267.

In such an embodiment, the bracket 266 may be attached to the radial arms 263 at a second bracket connection point 268 and a first radial arm connection points 264. The radial arms 263 may be attached to the frame 216 via a second radial arm connection point 265 and side plate rearward apertures 269.

The system 210 may also include an airbag 272 or a spring (e.g., spring 170/172) operatively attached to the frame 216 for mitigating issues associated with obstacles in the field by maintaining a constant down pressure on the assembly 212. The spring, for example, may attach directly to the bridge plate 226 or a smaller component which links the side plates 222, 224. The airbag 272, as particularly shown in FIG. 19, may be included in an airbag assembly secured to the frame 216 via side plate upper apertures 271.

According to other aspects of the present disclosure, a method for assembling the system 210 includes removing existing closing wheels 252 from a first location of a frame of an agricultural implement and attaching the closing wheels 252 at a second location of the frame. For example, on a Deere-brand agricultural implement, the closing wheels 252 may initially be attached to the frame 216 near the forward end 218 of the frame 216 and may be translated rearward and attached to the rearward end 220 of the frame 216 such that there is more distance created between the closing wheels 252 and the mechanism for opening the furrow (such as opening wheels, a shank, etc.) on the agricultural implement 214. The method also includes attaching the assembly 212 at the first location of the frame 216, effectively "replacing" the closing wheels 252. As noted above, the assembly 212 preferably includes discs 230 operatively attached to a lower linkage 232, a left-side linkage 234 and a right-side linkage 236 operatively attached to the lower linkage 232 which mounts at a forward end 218 of the frame 220. The method may also include operatively attaching a compaction wheel 261 at a third location of the frame 216. Utilizing the above method aids in providing an operator with a mountable furrow closing assembly that is universal and installable on agricultural implements manufactured by every major agricultural corporation.

According to other aspects of the present disclosure, a method for operating an agricultural implement, such as agricultural implement 214, includes opening a furrow, planting a seed in the furrow, and closing the furrow with a system for closing a furrow, such as system 210. The method may also include driving the agricultural implement 214 through a field, mitigating issues associated with obstacles in the field by maintaining a constant down pressure on the system with an airbag 272 or a spring, and dispensing fertilizer with fertilizer tubes that are integrated into the system 210. Numerous different types of seed or fertilizer may be utilized by the agricultural implement 214 in conjunction with the system 210 and the assembly 212.

It should be appreciated that most if not all of the components of the present disclosure may comprise any one or a combination of any known rigid materials, such as metals and metallic alloys, steel, plastics, composites, stone, synthetic materials imitating the properties of any of the preceding materials, and the like.

From the foregoing, it can be seen that the present invention accomplishes at least all of the stated objectives.

LIST OF REFERENCE NUMERALS

The following list of reference numerals is provided to facilitate an understanding and examination of the present disclosure and is not exhaustive. Provided it is possible to do so, elements identified by a numeral may be replaced or used in combination with any elements identified by a separate numeral. Additionally, numerals are not limited to the descriptors provided herein and include equivalent structures and other objects possessing the same function.

110 system (cast arm design)
112 assembly
114 implement
115 direction of travel
116 frame
118 forward end
120 rearward end
122 left-side plate
124 right-side plate
126 bridge plate
127 bridge plate connection
128 bridge plate apertures
130 discs
131 disc connection
132 cast arm
133 body portion
134 left-side surface 136 right-side surface
137 mounting apertures
138 back portion, ridge, or flange
140 neck portion
141 neck portion aperture
142 first leg portion
143 first leg aperture
144 second leg portion
145 second leg aperture
146 bottom surface
147 centerline
148 side plate forward apertures
150 nut and bolt assembly
152 closing wheels
153 closing wheel connections
154 mounting arms
155 mounting arm first connection points
156 mounting shell
157 mounting shell connection points
158 mounting arm second connection points
160 nut and bolt assembly
161 compaction wheel
162 compaction wheel connection points
163 radial arms
164 radial arm first connection points
165 radial arm second connection points
166 bracket
167 bracket first connection points
168 bracket second connection points
169 side plate rearward apertures
170 first spring
171 side plate upper apertures
172 second spring
173 second spring connection point
174 adjoining plate
175 adjoining plate apertures
176 adjoining pin
177 adjoining pin connection point
180 fertilizer tube(s)
181 inlet
182 outlet
183 inner bend
184 outer bend
185 lower bend
210 system (four-linkage design)
212 assembly
214 implement
215 direction of travel
216 frame
218 forward end
220 rearward end
222 left-side plate
224 right-side plate
226 bridge plate
227 bridge plate connection
228 bridge plate apertures
230 discs
231 disc connection
232 lower linkage
234 left-side linkage
236 right-side linkage
238 bridge linkage
240 lower linkage rearward aperture
241 lower linkage central aperture
242 lower linkage forward aperture
243 side linkage lower apertures
244 side linkage central apertures
245 side linkage upper apertures
246 bridge linkage rearward aperture
247 bridge linkage forward aperture
248 side plate forward apertures
249 side plate central apertures
250 nut and bolt assembly
252 closing wheels
253 closing wheel connections
254 mounting arms
255 mounting arm first connection points
256 mounting shell
257 mounting shell connection points
258 mounting arm second connection points
260 nut and bolt assembly
261 compaction wheel
262 compaction wheel connection points
263 radial arms
264 radial arm first connection points
265 radial arm second connection points
266 bracket
267 bracket first connection points
268 bracket second connection points
269 side plate rearward apertures
271 side plate upper apertures
272 airbag The present disclosure is not to be limited to the particular embodiments described herein. The following claims set forth a number of the embodiments of the present disclosure with greater particularity.

What is claimed is:

1. A system for closing a furrow comprising:
a frame having a forward end and a rearward end;
a mountable furrow closing assembly comprising:
 a cast arm including a neck portion attached to the frame toward the forward end;
 a forward disc attached to a first leg portion of the cast arm; and
 a rearward disc attached to a second leg portion of the cast arm;
 wherein a body portion of the cast arm connects the first leg portion and the second leg portion to the neck portion; and
a compaction wheel operatively attached to the frame toward the rearward end;
wherein a width between the forward disc and rearward disc is adjustable or an angle formed between the forward disc and rearward disc is adjustable.

2. The system of claim 1 wherein the cast arm is asymmetrically shaped about every plane capable of traversing a location on or within the cast arm.

3. The system of claim 1 wherein the cast arm further comprises a back portion, ridge, or flange supporting the body portion from the neck portion to the first leg portion and the second leg portion.

4. The system of claim 1 wherein the first leg portion is positioned more forwardly than the second leg portion.

5. The system of claim 1 wherein the cast arm includes mounting apertures in the body portion.

6. The system of claim 5 further comprising an airbag assembly or a spring assembly mounted to the cast arm through at least one of the mounting apertures.

7. The system of claim 5 further comprising a fertilizer tube mounted to the cast arm through at least one of the mounting apertures.

8. The system of claim 7 wherein an inlet of the fertilizer tube is operatively connected to a fertilizer supply containing fertilizer, the fertilizer tube configured to dispense said fertilizer through an outlet located aft of at least the forward disc.

9. The system of claim 1 further comprising closing wheels that are spiked, toothed, or treaded.

10. The system of claim 1 wherein the closing wheels are attached to mounting arms, said mounting arms being attached to a mounting shell surrounding the rearward end.

11. The system of claim 10 wherein the compaction wheel is operatively attached to radial arms at a more rearward position than the closing wheels.

12. The system of claim 11 wherein the compaction wheel is attached to a bracket and the bracket is attached to the radial arms.

13. The system of claim 11 wherein the radial arms are attached to the frame at forward apertures of the radial arms and rearward apertures of a left-side plate and a right-side plate of the frame, wherein the forward apertures of the radial arms and the rearward apertures of the left-side plate and the right-side plate are aligned.

14. The system of claim 13 wherein the left-side plate and the right-side plate are separated by a bridge plate welded to the left-side plate and the right-side plate.

15. A mountable furrow closing assembly, comprising:
discs operatively attached to a cast arm, said cast arm operatively attached to a forward end of a frame of an agricultural implement;
wherein the cast arm comprises:
a neck portion attached to the frame toward the forward end;
a first leg portion operatively attached to one of the discs;
a second leg portion operatively attached to another one of the discs; and
a body portion connecting the first leg portion and the second leg portion to the neck portion, wherein the body portion comprises a centerline having at least one inflection point located between the neck portion and the leg portions.

16. The mountable furrow closing assembly of claim 15 wherein the cast arm is asymmetrically shaped about every plane capable of traversing a location on or within the cast arm.

17. The mountable furrow closing assembly of claim 15 wherein the cast arm further comprises a back portion, ridge, or flange supporting the body portion from the neck portion to the first leg portion and the second leg portion.

18. The mountable furrow closing assembly of claim 15 wherein the first leg portion is positioned more forwardly than the second leg portion.

19. The mountable furrow closing assembly of claim 15 wherein the cast arm includes mounting apertures in the body portion.

20. The mountable furrow closing assembly of claim 15 wherein the cast arm is casted with steel.

* * * * *